March 21, 1961 — A. V. WEDENSKY — 2,975,911
APPARATUS FOR UNLOADING, ORIENTING AND FEEDING ARTICLES
Filed Aug. 7, 1957 — 11 Sheets-Sheet 1
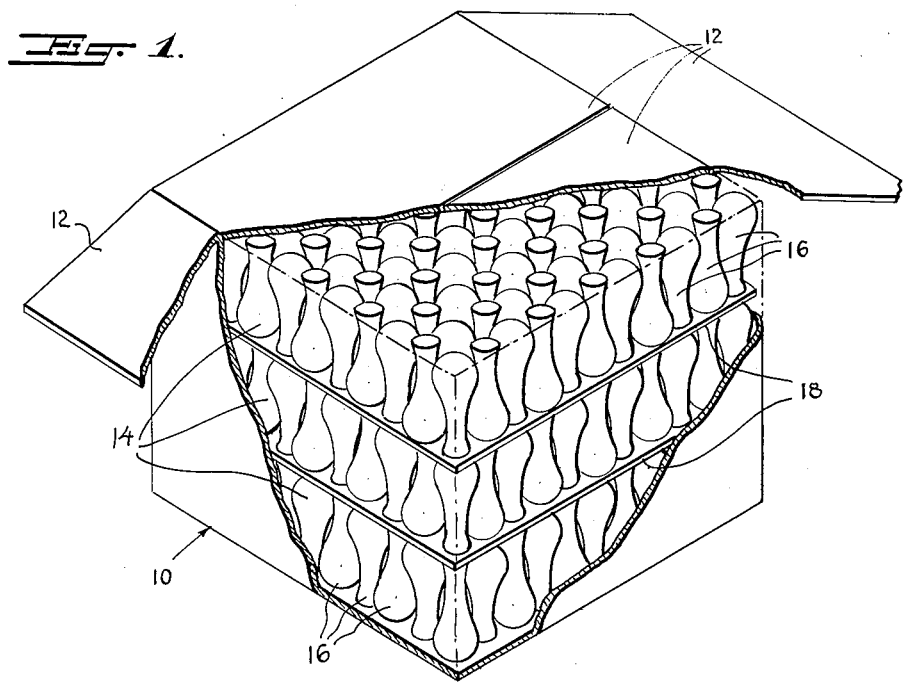
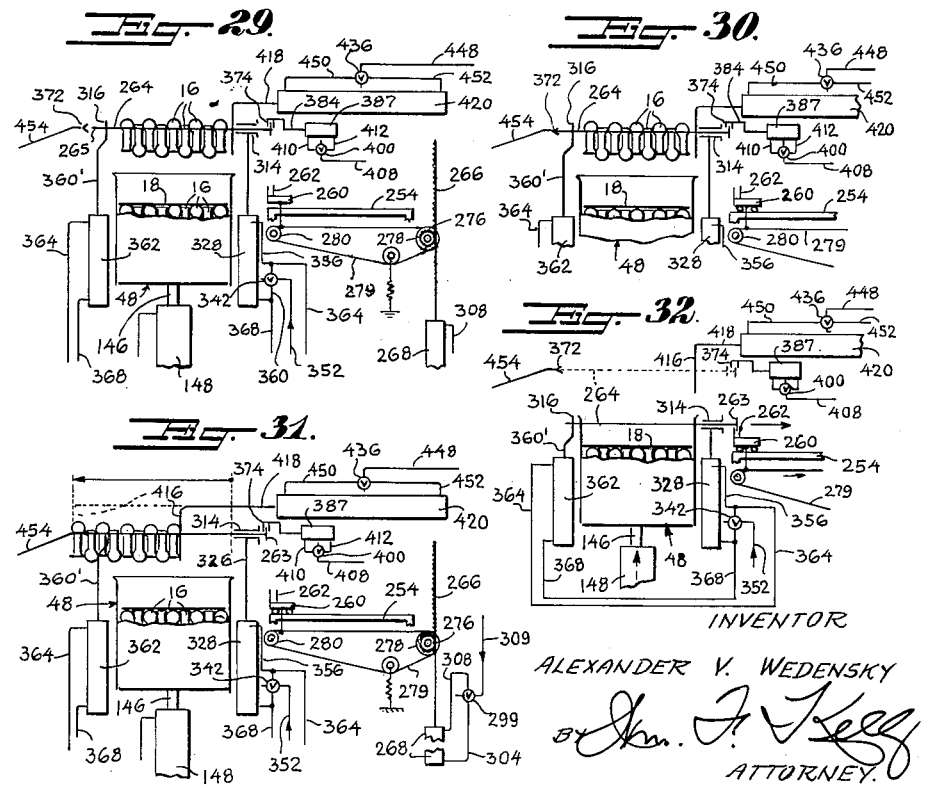
INVENTOR
ALEXANDER V. WEDENSKY
ATTORNEY March 21, 1961 A. V. WEDENSKY 2,975,911
APPARATUS FOR UNLOADING, ORIENTING AND FEEDING ARTICLES
Filed Aug. 7, 1957 11 Sheets-Sheet 2
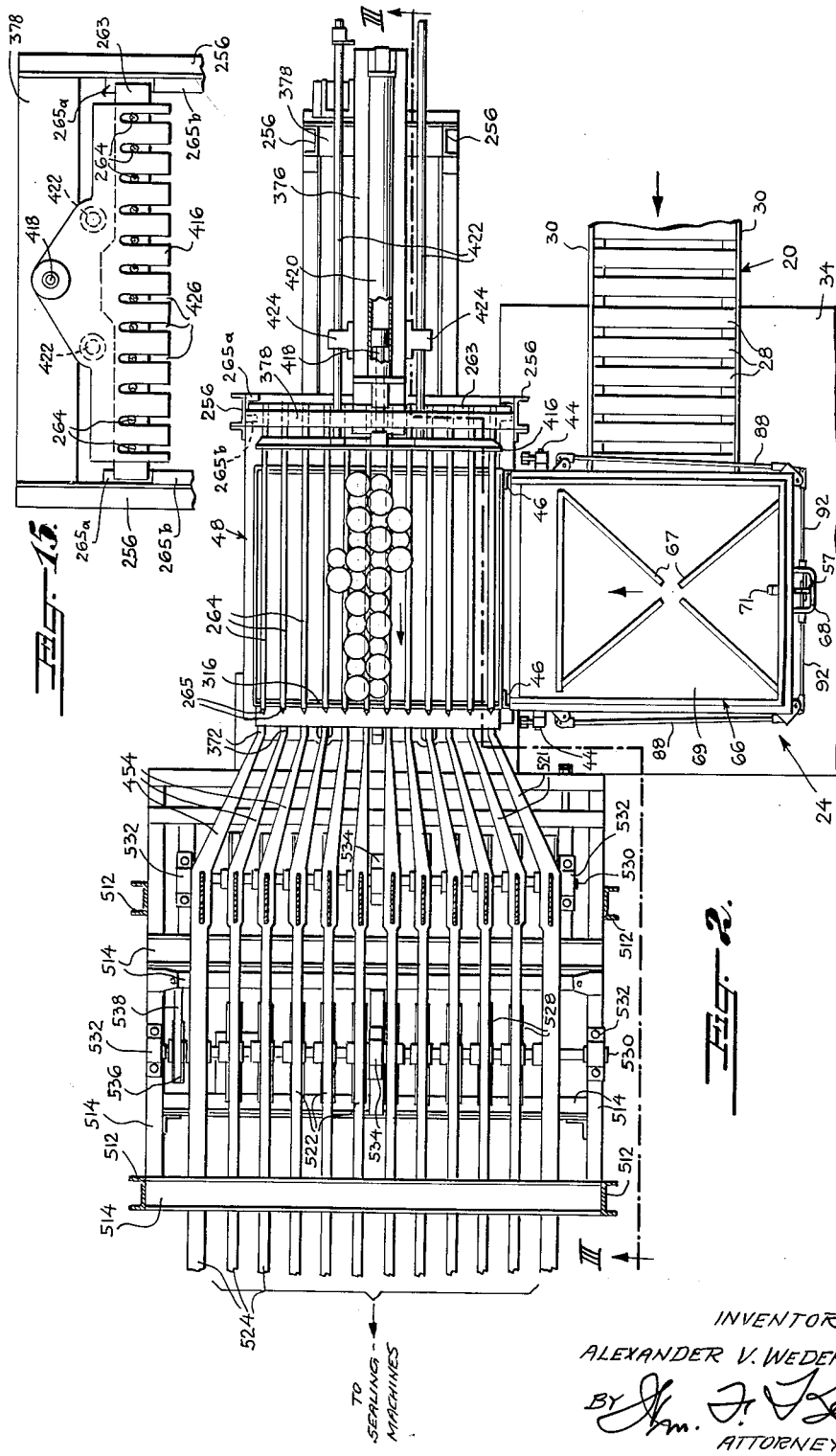

March 21, 1961 A. V. WEDENSKY 2,975,911
APPARATUS FOR UNLOADING, ORIENTING AND FEEDING ARTICLES
Filed Aug. 7, 1957 11 Sheets-Sheet 3
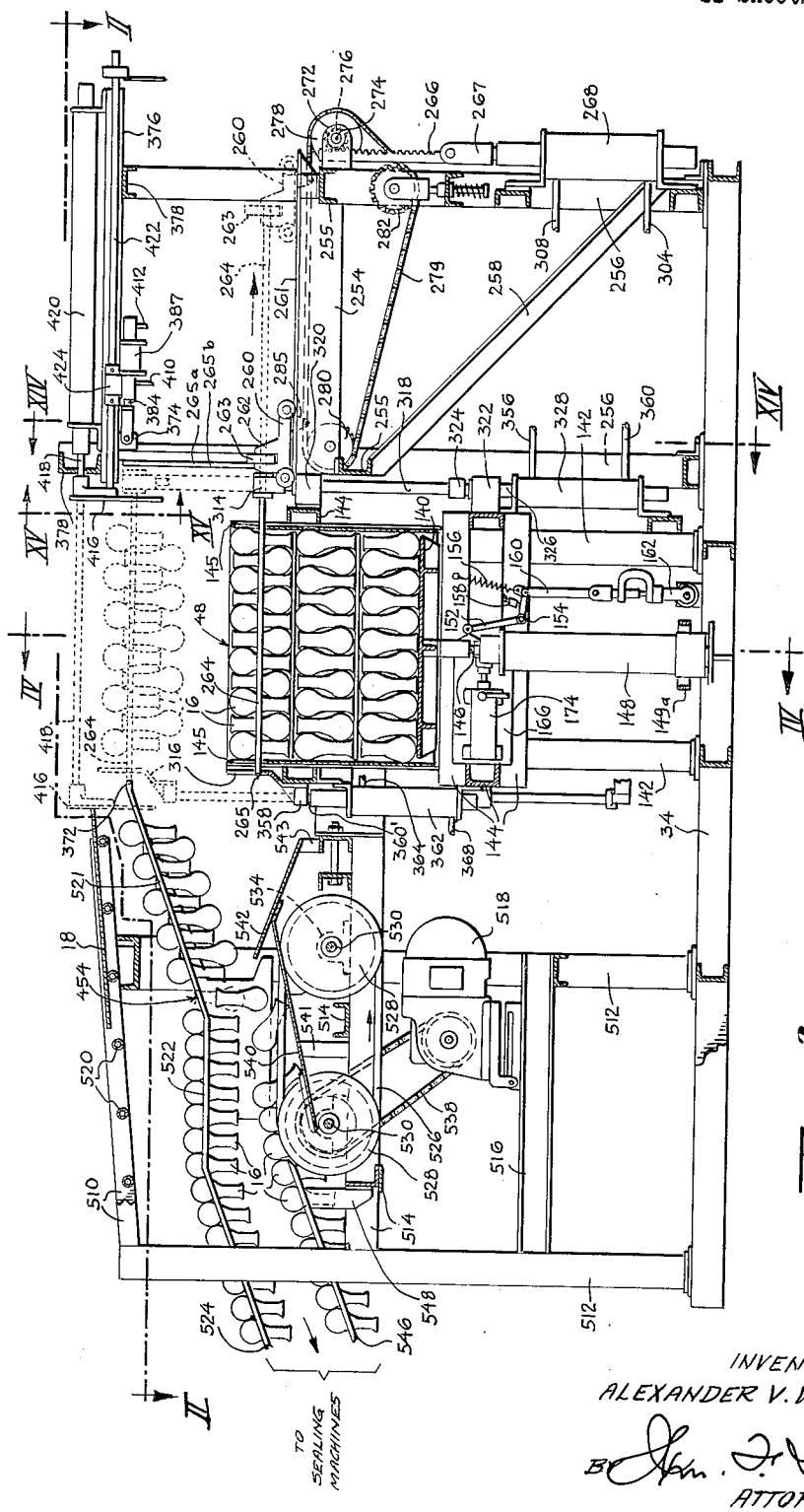
INVENTOR
ALEXANDER V. WEDENSKY
ATTORNEY

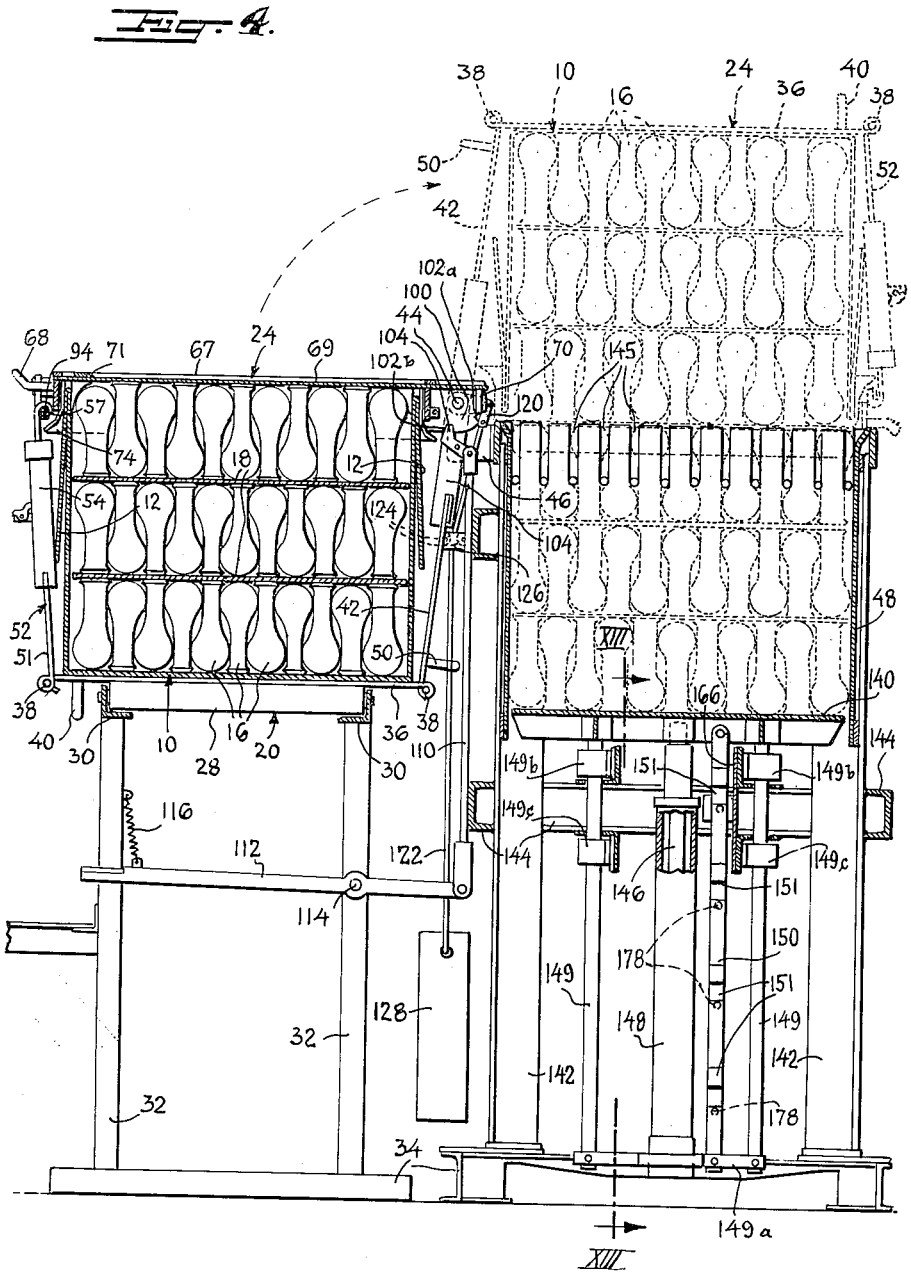

March 21, 1961
A. V. WEDENSKY
2,975,911
APPARATUS FOR UNLOADING, ORIENTING AND FEEDING ARTICLES
Filed Aug. 7, 1957
11 Sheets-Sheet 5
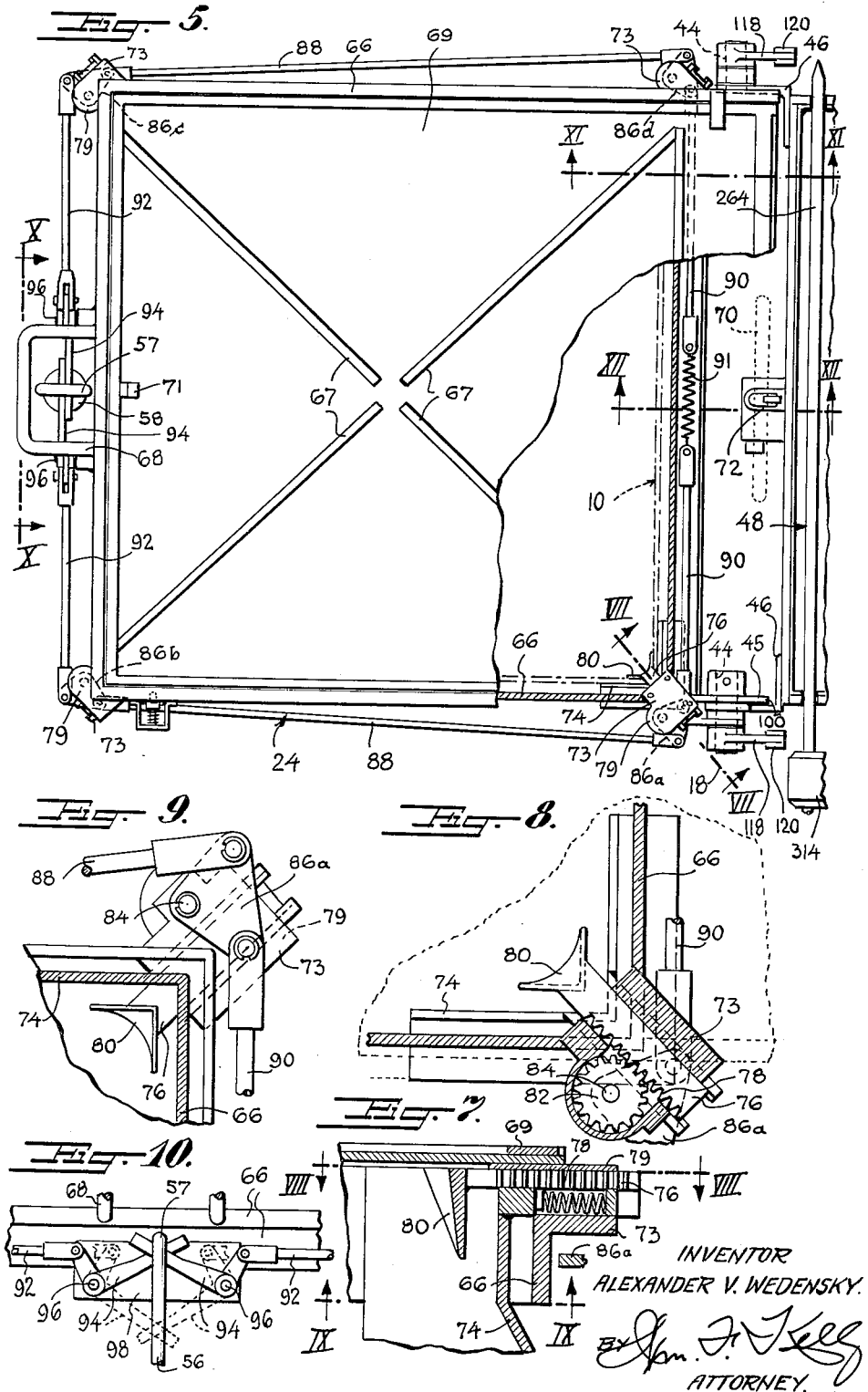
INVENTOR
ALEXANDER V. WEDENSKY.
ATTORNEY.

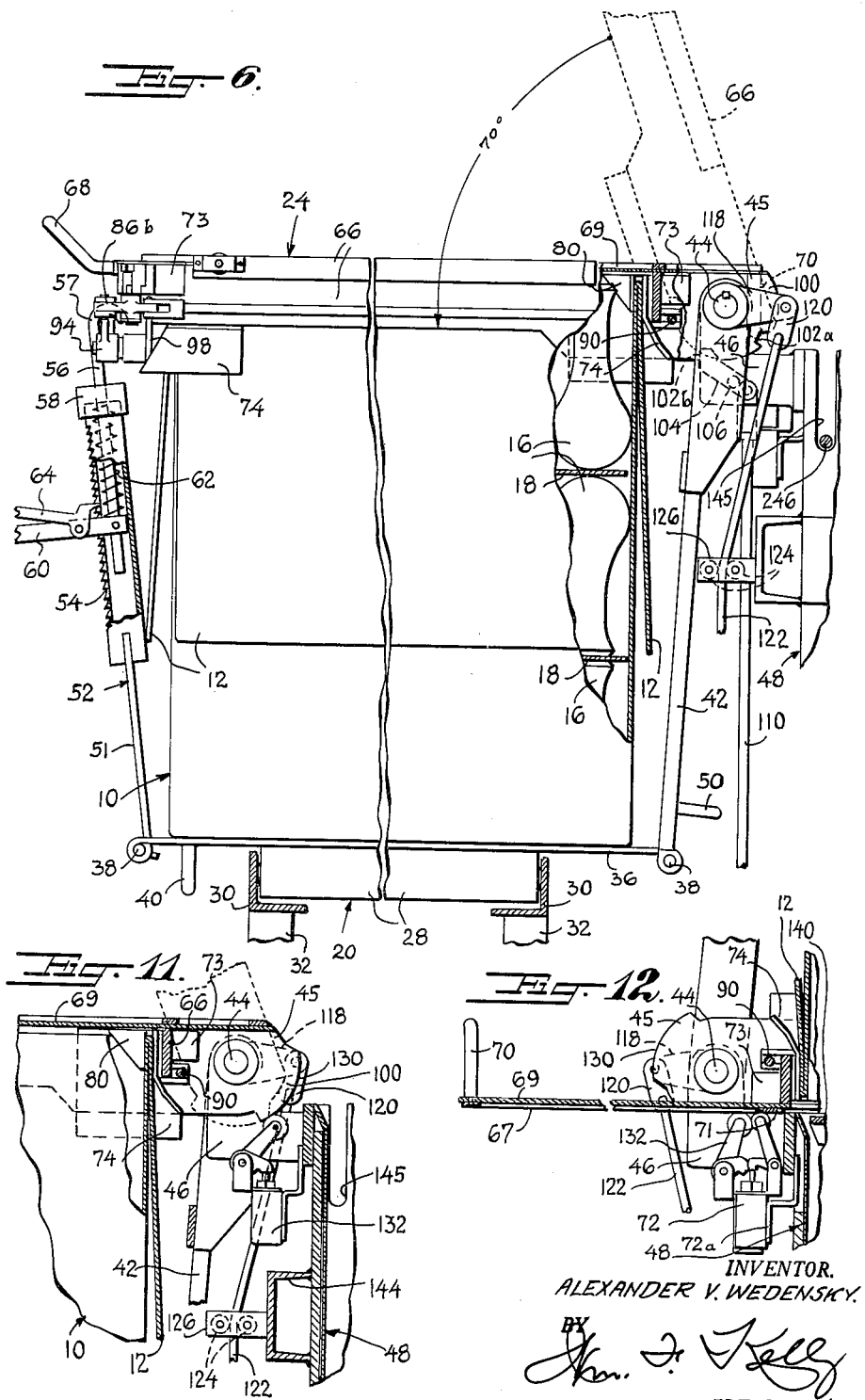

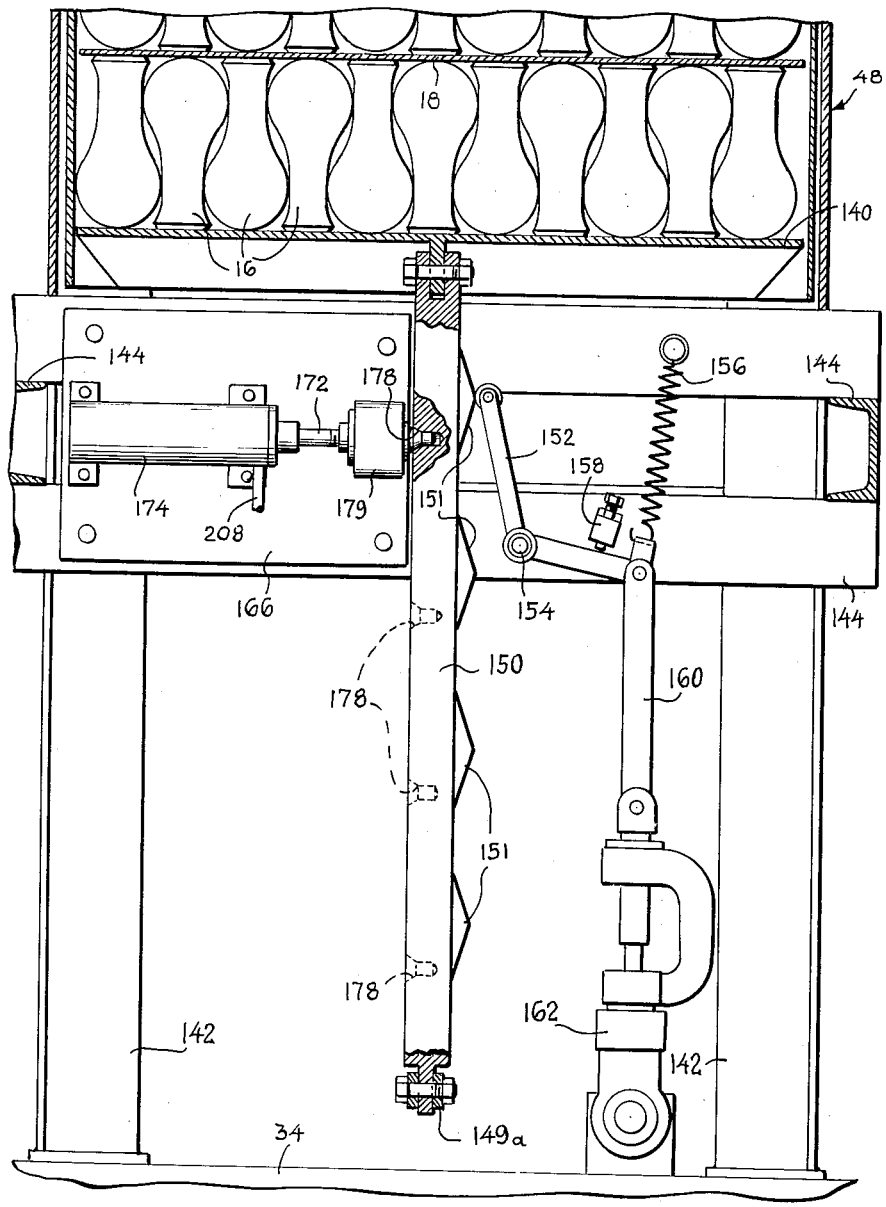

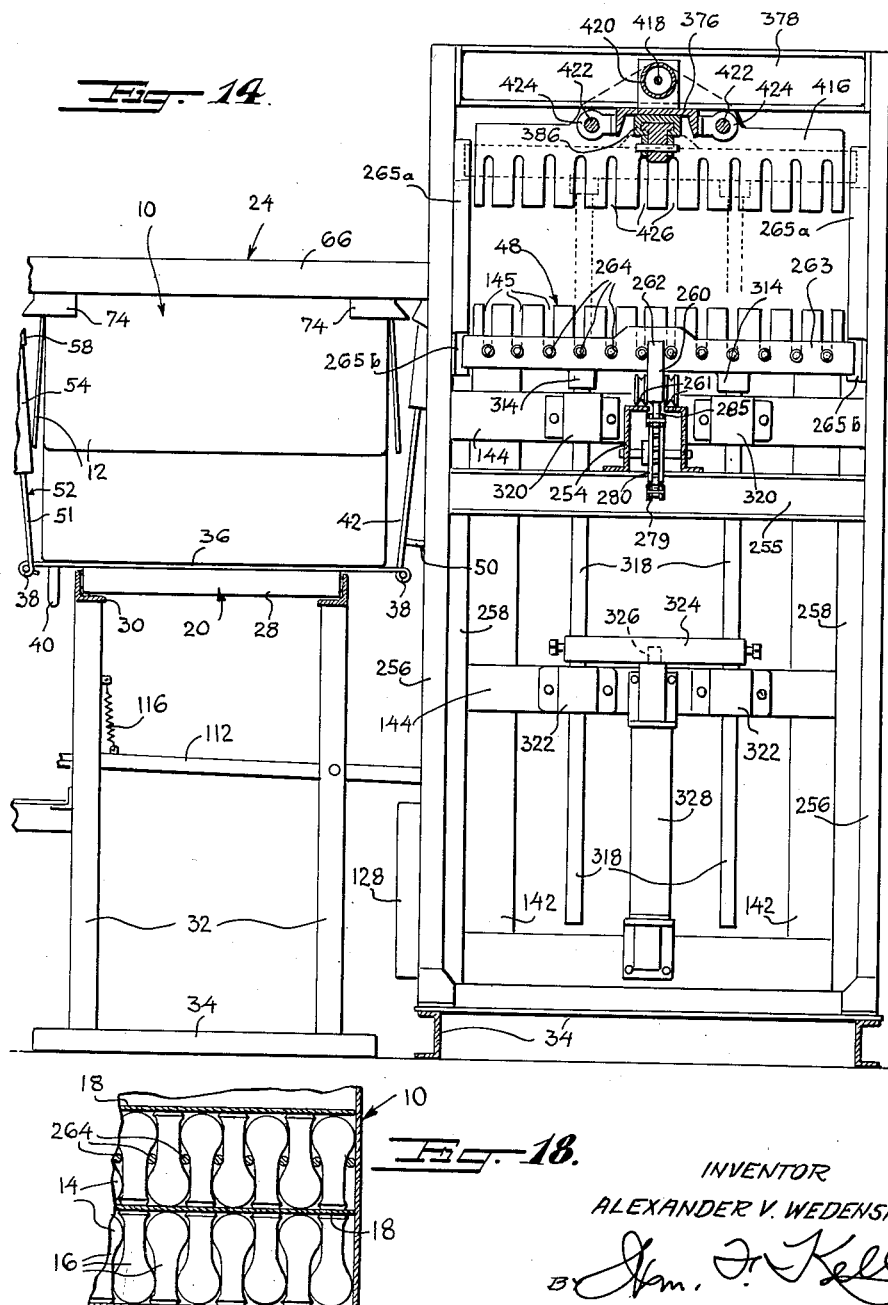

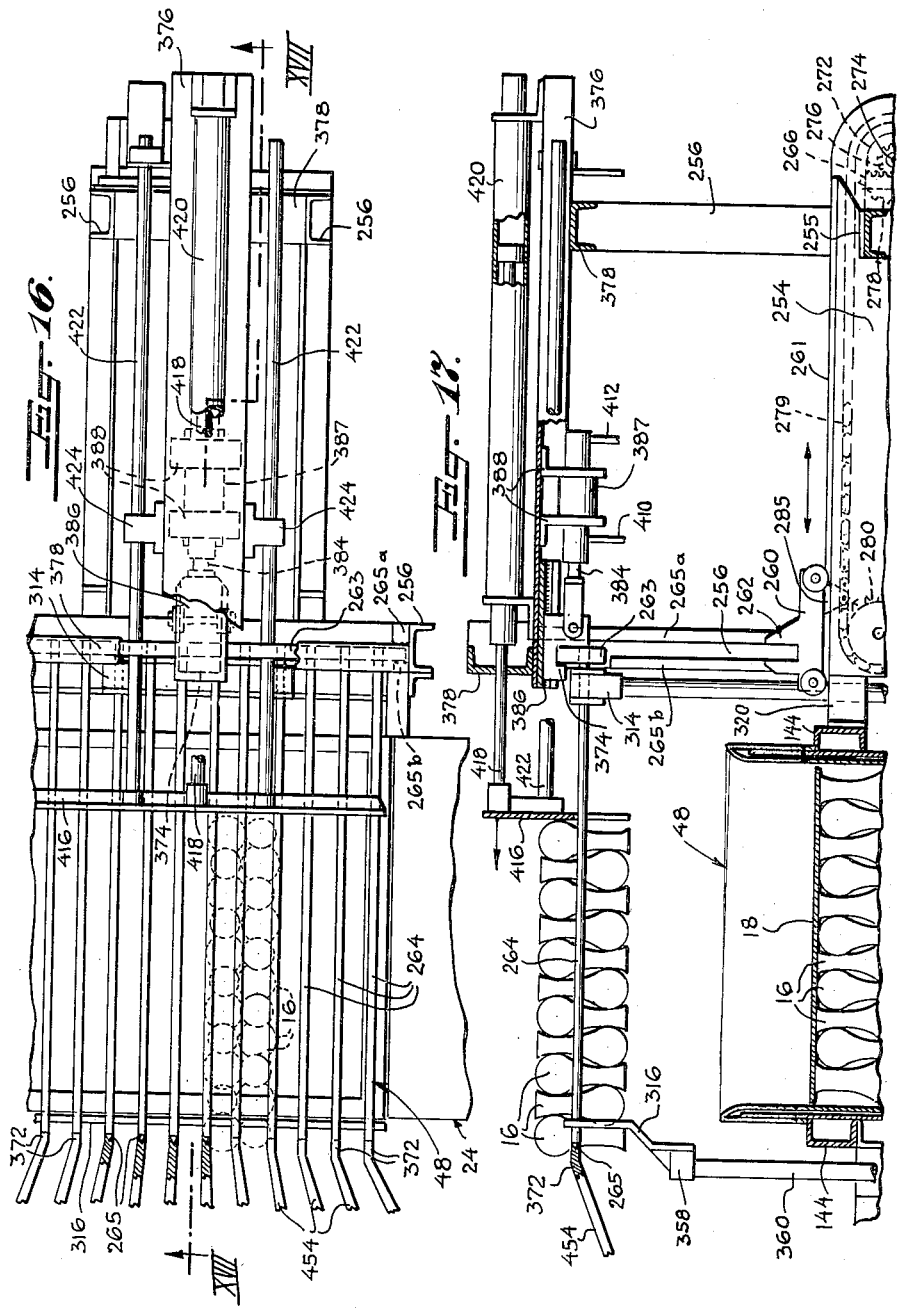
INVENTOR
ALEXANDER V. WEDENSKY
ATTORNEY.

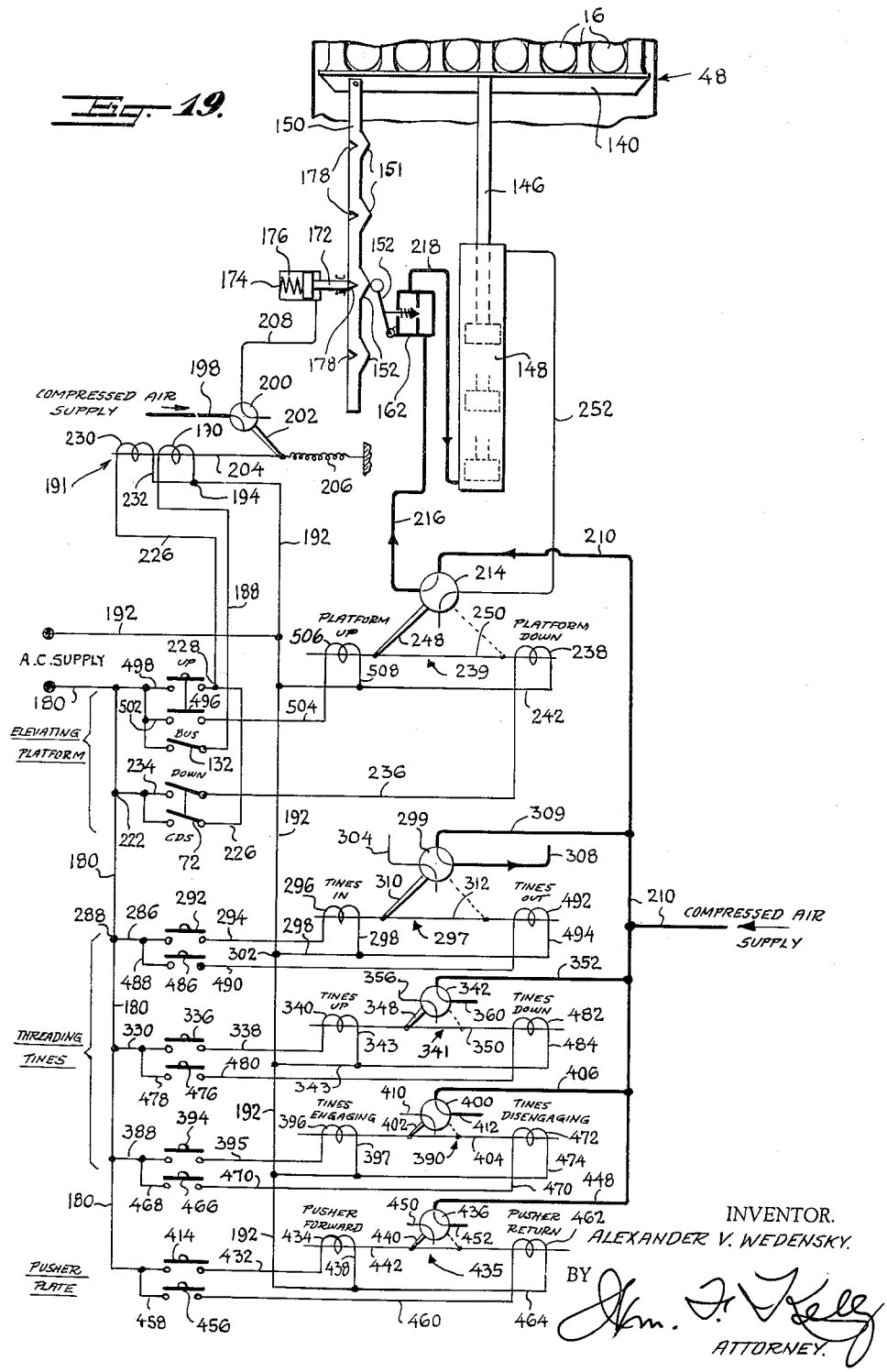

March 21, 1961 A. V. WEDENSKY 2,975,911
APPARATUS FOR UNLOADING, ORIENTING AND FEEDING ARTICLES
Filed Aug. 7, 1957 11 Sheets-Sheet 11
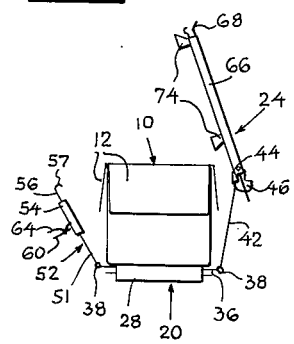
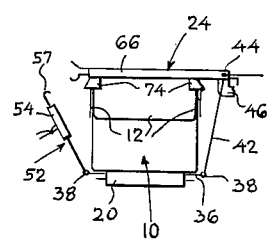
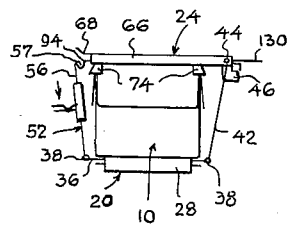
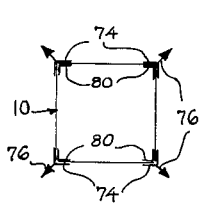
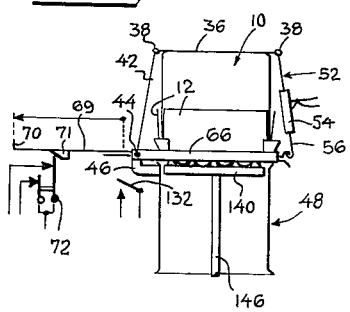
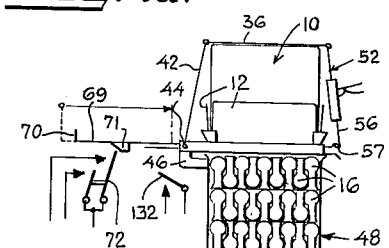
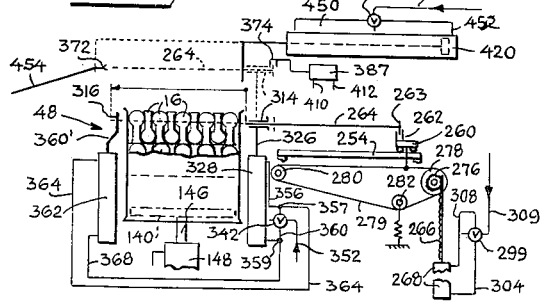
INVENTOR.
ALEXANDER V. WEDENSKY.
BY
ATTORNEY

United States Patent Office 2,975,911
Patented Mar. 21, 1961

2,975,911

APPARATUS FOR UNLOADING, ORIENTING, AND FEEDING ARTICLES

Alexander V. Wedensky, Mountain Springs, N.J., assignor to Westinghouse Electric Corporation, East Pittsburgh, Pa., a corporation of Pennsylvania Filed Aug. 7, 1957, Ser. No. 676,738

6 Claims. (Cl. 214—8.5)

The present invention relates to apparatus for the manufacture of incandescent lamps and, more particularly, to apparatus for unloading, orienting and feeding incandescent lamp bulbs to a sealing machine.

An incandescent lamp bulb has a generally spherical body portion and a cylindrical neck portion of smaller diameter. The bulbs are usually packed in cartons or hampers in individual layers separated by cardboard sheets. Each layer of bulbs is arranged in a plurality of rows or columns of alternately inverted bulbs so that each "neck-up" bulb, for example, is surrounded by four "body-up" or "neck-down" bulbs. This packing arrangement provides a maximum number of bulbs in a minimum amount of hamper space.

Heretofore the bulbs have either been manually fed directly to the feeding machine or manually fed to a semi-automatic bulb feeder such as shown in U.S. Patent No. 1,783,806, issued December 2, 1930, to W. W. Loebe et al. There is no provision in bulb feeding apparatus of this type for the unloading of the bulbs from the hamper or for orienting of the bulbs after unloading in the desired "neck-down" position as is required for delivery to the sealing machine for fabrication of the bulbs into completed incandescent lamps. Further, there is considerable handling of the fragile glass bulbs in the transfer of the bulbs from the hamper to the loading chutes of such bulb feeders. This handling results in considerable shrinkage of material due to breakage of the bulbs. In addition, such a bulb feeder is not positive enough or fast enough in the feeding of bulbs for present high speed sealing machines.

The present invention contemplates the provision of an automatic apparatus for unloading the bulbs from the hamper, orienting the bulbs in the required "neck-down" position and feeding the oriented bulbs to a sealing machine. This automatic apparatus comprises a hamper feeding means; a hamper receiving, squaring and inverting mechanism for delivering the squared hamper to a bulb magazine provided with an elevating platform; a bulb threading and lifting mechanism for selecting and lifting the upper layer of bulbs from the bulb magazine into registry with a sorting and feeding means; a reciprocable mechanism for inserting the tines of the threading and lifting mechanism into the tine receiving ends of the sorting and feeding means; a horizontally reciprocable bulb delivery mechanism for pushing the aligned layer of lamp bulbs into the sorting and feeding means; and means on the sorting and feeding means for inverting the bulbs into the "neck-down" position and for delivery to an article receiving means, such as a sealing machine.

It is accordingly the general object of the invention to provide apparatus for receiving a hamper of bulbous articles arranged in alternate "neck-down"-"neck-up" order, for squaring and inverting the hamper, for transferring the articles into an article receiving magazine, for selecting and elevating the top layer of articles, for rejecting the "neck-up" articles, for feeding the "neck-down" articles to an article receiving means, for orienting the "neck-up" articles in the desired "neck-down" position and for feeding the oriented articles to said article receiving means.

An additional object is to provide automatic apparatus which eliminates the handling of fragile articles during the transfer of said articles from a hamper to an article receiving means.

A further object is to provide automatic apparatus which assures positive feeding of articles to an article receiving means.

Another object is to provide automatic apparatus which is adapted to feed articles to an article receiving means at high speeds.

Still further objects of the present invention will become apparent to those skilled in the art by reference to the accompanying drawings in which Fig. 1 is a perspective view of a hamper, partially broken away to show a plurality of layers of bulbous articles, such as incandescent lamp bulbs, which layers have a plurality of rows of alternate "neck-up" and "neck-down" bulbs.

Fig. 2 is a plan view of the apparatus for unloading the articles from a hamper, orienting the "neck-up" articles and for feeding the oriented articles to an article receiving machine and showing the hamper feeding conveyor; the pivotable hamper receiving, squaring and inverting mechanism; the bulb magazine and its reciprocable elevating platform; the bulb threading and lifting mechanism; the tine inserting mechanism; the bulb delivery mechanism; the bulb sorting and feeding means; the feeding and orienting means for inverting the "neck-up" bulbs.

Fig. 3 is a vertical sectional view of the apparatus of Fig. 2 along the line III—III of Fig. 2 in the direction of the arrows.

Fig. 4 is a vertical sectional view of the hamper receiving, squaring and inverting mechanism, the bulb magazine, elevating platform and reciprocating mechanism for the elevating platform along the line IV—IV of Fig. 3 in the direction of the arrows.

Fig. 5 is a plan view of the pivotable hamper receiving, squaring and inverting mechanism with a portion of the cover frame broken away to show the details of the hamper squaring device.

Fig. 6 is a side elevational view of the hamper receiving, squaring and inverting mechanism, with the hamper squaring device in the operating position and having a portion of the hamper broken away to show the details of said hamper squaring device.

Fig. 7 is a fragmentary vertical sectional view of a portion of the hamper squaring device along the line VII—VII of Fig. 5 in the direction of the arrows.

Fig. 8 is a horizontal sectional view of the hamper squaring device along the line VIII—VIII of Fig. 7 in the direction of the arrows.

Fig. 9 is a horizontal sectional view of the hamper squaring device along the line IX—IX of Fig. 7 in the direction of the arrows.

Fig. 10 is an end elevational view of the actuating means for the hamper squaring device along the line X—X of Fig. 5 in the direction of the arrows.

Fig. 11 is an enlarged vertical sectional view of the hamper squaring device along the line XI—XI of Fig. 5 in the direction of the arrows and showing a cam and a switch for actuating the reciprocating mechanism for the elevating platform of the bulb magazine.

Fig. 12 is a vertical sectional view, similar to Fig. 11, along the line XII—XII of Fig. 5 in the direction of the arrows and showing the hamper in an inverted position on the elevating platform and another switch and cam for actuating the lowering of the reciprocating mechanism for the elevating platform of the bulb magazine.

Fig. 13 is an enlarged fragmentary vertical sectional view of the reciprocating mechanism for the elevating platform of the bulb magazine along the line XIII—XIII of Fig. 4 in the direction of the arrows and showing the reciprocating mechanism in its lowermost position.

Fig. 14 is a side elevational view of the hamper receiving, squaring and inverting mechanism, bulb magazine and the bulb threading and lifting mechanism, which threading and lifting mechanism is shown in vertical section along the line XIV—XIV of Fig. 3 in the direction of the arrows.

Fig. 15 is an end elevational view of the bulb delivery mechanism along the line XV—XV of Fig. 3 in the direction of the arrows.

Fig. 16 is a fragmentary enlarged plan view, similar to Fig. 2, showing the bulb sorting and feeding means and the bulb delivery mechanism in the bulb delivery position.

Fig. 17 is a vertical sectional view of the bulb sorting and feeding means and bulb delivery mechanism along the line XVII—XVII of Fig. 16 in the direction of the arrows.

Fig. 18 is a fragmentary vertical sectional view showing the top two layers of bulbs in the bulb magazine and the bulb threading and lifting mechanism in position for lifting the upper layer of the bulbs.

Fig. 19 is a simplified wiring diagram showing the circuits and the essential operating parts for the apparatus of Fig. 1.

Fig. 20 is a diagrammatic side elevational view of the hamper receiving, squaring and inverting mechanism in the hamper receiving position.

Fig. 21 is a view similar to Fig. 20 and showing the pivotable cover frame of the hamper receiving, squaring and inverting mechanism in engagement with the open end of the hamper, before the squaring operation.

Fig. 22 is a diagrammatic plan view of the hamper and the hamper receiving, squaring and inverting mechanism of Fig. 21.

Fig. 23 is a view similar to Fig. 21 and showing the actuating means of the hamper squaring device in engagement with the cover frame of the hamper receiving, squaring and inverting mechanism and ready for hamper squaring operation.

Fig. 24 is a view similar to Fig. 22 and showing the squared hamper and hamper squaring device after the hamper squaring operation.

Fig. 25 is a diagrammatic side elevational view of the pivotable hamper receiving, squaring and inverting mechanism, the bulb magazine, the elevating platform, and the reciprocating mechanism for the elevating platform and showing the hamper receiving, squaring and inverting mechanism in the position for actuating the reciprocating mechanism for the elevating platform.

Fig. 26 is a diagrammatic side elevational view of the hamper and hamper receiving, squaring and inverting mechanism in the inverted position on the bulb magazine and showing the withdrawal of a retractable slide in the cover frame of the hamper receiving, squaring and inverting mechanism, to actuate the reciprocating mechanism for the elevating platform and the lowering of the elevating platform.

Fig. 27 is a view similar to Fig. 26 and showing the return of the slide within the cover frame of the hamper receiving, squaring and inverting mechanism after the lowering of the elevating platform by the reciprocating mechanism, preparatory for the inversion of the now empty hamper receiving, squaring and inverting mechanism to its starting position.

Fig. 28 is a diagrammatic side elevational view, similar to Fig. 3, showing the threading and lifting mechanism ready to engage the first layer of bulbs and showing the elevated position of the threading and lifting mechanism in dotted lines.

Fig. 29 is a diagrammatic side elevational view of the bulb threading and lifting mechanism in its "up" position and in engagement with the tine inserting mechanism preparatory to the insertion of the tines of the threading and lifting mechanism into the end portions of the sorting and feeding means.

Fig. 30 is a view, similar to Fig. 29, and showing the tines of the bulb threading and lifting mechanism inserted in the end portions of the sorting and feeding means.

Fig. 31 is a view similar to Fig. 30 and showing the operation of the bulb delivery mechanism and the delivery of the bulbs to the delivery chutes.

Fig. 32 is a view similar to Fig. 31 showing the bulb delivery mechanism in its starting position and the bulb threading and lifting mechanism in its lowermost position preparatory to the withdrawal of the bulb threading and lifting mechanism from the bulb magazine and preparatory to the raising of the elevating platform for the presentment of the second layer of bulbs to the bulb threading and lifting mechanism.

Although the principles of the invention are broadly applicable to the unloading, orienting and feeding of bulbous articles, the invention is particularly adapted for use in conjunction with the unloading, orienting and feeding of incandescent lamp bulbs and hence has been so illustrated and will be so described.

With specific reference to the form of the invention illustrated in the drawings an incandescent lamp bulb hamper or carton 10 is shown in Fig. 1 having top flaps 12 and containing a plurality of layers 14, for example 3 in the present showing of Fig. 1, of incandescent lamp bulbs 16. Each of the layers 14 is spaced from the adjacent lower layer by a spacing sheet 18, suitably cardboard and comprises rows or columns of the bulbs 16 arranged in alternate "neck-down" and "neck-up" order, so that a maximum number of bulbs 16, suitably one hundred twenty one, may be contained within a given layer 14.

It will be understood from a consideration of Figs. 1 and 18 that the bulbs 16 have a generally spherical body portion and a generally cylindrical neck portion of a smaller diameter than the body portion, which neck portions are provided with a culleted or flared bottom. Thus, when the bulbs 16 are arranged in the above mentioned alternating order a substantial space, shown particularly in Fig. 18, exists between the mid-portions of adjacent rows of bulbs 16 for the insertion therein of a threading member 264, as hereinafter explained.

A hamper 10 loaded with bulbs 16 and having its top flaps 12 folded down, may be fed by hand or by a conveyor 20 (Figs. 2 and 4) to a hamper receiving, squaring and inverting mechanism 24. As shown particularly in Fig. 4 the conveyor 20 consists of a plurality of rollers 28 pivoted in longitudinal channels 30, which channels 30 are supported by legs 32 upstanding from a bed-plate 34 of apparatus for unloading the bulbs 16 from the hamper 10, orienting the bulbs 16 in the "neck-down" position and feeding the oriented bulbs 16 to an article receiving means, such as a sealing machine (not shown).

*Hamper receiving, squaring and inverting mechanism*

The hamper receiving, squaring and inverting mechanism 24 (Figs. 4, 6, 20 through 22) has a plurality of bottom bands or slats 36, for example four, only one of which slats 36 is shown in Figs. 4 and 6, disposed between adjacent rollers 28 on the delivery end of the conveyor 20. To provide means for integrating the bottom slats 36 horizontal rods 38 extend through the outer hub portions, as viewed in Figs. 4 and 6, of the bottom slats 36, one of which slats 36 is provided with a handle 40 for inverting the hamper receiving, squaring and inverting mechanism 24. One side of the mechanism 24 comprises a pair of angularly extending side bands or slats 42 which are limited pivotably in a clockwise direction, as viewed in Figs. 4 and 6, on the right hand rod 38.

These angular bands 42 have their upper ends secured around a pair of stud shafts 44 journalled in brackets 46 affixed to the adjacent side wall of a bulb storing means or bulb magazine 48. One of the angular side bands 42 is provided with an operating handle 50, Fig. 4, for returning the emptied hamper receiving, squaring and inverting mechanism 24 from its inverted position on the bulb magazine 48 (Fig. 4) to its initial position.

The other side member of the mechanism 24 is a resilient side band 52 provided with a bottom rod 51 (Figs. 4 and 6) which is limitedly pivotable in a counterclockwise direction on the left hand rod 38. This side band 52 comprises a hollow ratchet 54 affixed to the upper portion, as viewed in Fig. 4, of the rod 51 and also to an upper rod 56 provided with a hooked upper end 57 (Fig. 6) slidable in an end cap 58 of the ratchet 54. By reference particularly to Fig. 6, it will be noted that the lower portion of the rod 56 is pinned to a ratchet handle 60 which is slidable in a longitudinal slot in the ratchet 54. To bias the handle 60 and the lower end of the rod 56 away from the cap 58, a compression spring 62 is provided on the rod 56 between the handle 60 and the cap 58. For the purpose of locking the handle 60 in a desired position, a pawl 64 pivoted on the handle 60, normally engages the toothed portions of the ratchet 54.

A cover frame 66 of the hamper receiving, squaring and inverting mechanism 24, suitably of general picture frame construction, is pivoted on the stud shafts 44 by means of hinges 45 and is provided with a handle 68 on the left hand end, as viewed in Figs. 4 and 6. To provide article retaining means within the cover frame 66, a slide 69 (Figs. 4, 6, 12 and 26), essentially a flat plate provided with diagonal reinforcing ribs 67 (Fig. 5) is contained in a suitable recess in the cover frame 66. The slide 69 is provided with a handle 70 (Fig. 4) and carries a depending cam 71 (Figs. 4 and 5). When the hamper receiving, squaring and inverting mechanism 24 is in the inverted position shown in Fig. 4 withdrawal of the slide 69 from the cover frame 66 causes the cam 71 to operate and close a normally open double-throw switch 72 (Figs. 5, 12, 19, 26) mounted on a bracket 72a (Fig. 12) secured to the adjacent side wall of the bulb magazine 48, thus actuating a work circuit as hereinafter related. The cover frame 66 carries a hamper squaring device for stretching and squaring the four corners of the hamper 10.

*Hamper squaring device*

Each corner of the cover frame 66 supports a diagonally disposed guide bracket 73 (Figs. 5, 7-9) from which depends a stationary anvil 74 with the latter being provided with an outwardly flared lower portion, as viewed in Fig. 7, for guiding the corners formed by the side walls and bend down top flaps 12 of the carton or hamper 10 into the squaring position. To provide corner stretching means for the device 24 a slide 76 having a rack 78 in one side wall thereof and a stretcher 80 on its inner operating end, as viewed in Figs. 8 and 9, is reciprocable in the guide bracket 73 and retained therein by a cover plate 79. The rack 78 meshes with a gear 82 affixed to a shaft 84 depending, as viewed in Fig. 8, from the bracket 73. Rotation of the gear 82 moves the rack 78 diagonally outward from the center of the cover frame 66 to compress an adjacent corner of the hamper 10 between the stretcher 80 and the anvil 74. To achieve the desired rotation of the gear 82, a rear triangular shaped connecting plate 86a, as viewed in Fig. 5, is secured to one of the rear shafts 84 and is joined by a side connecting rod 88 to a similarly mounted front connecting plate 86b shown in dotted lines in Fig. 5. In like manner the rear connecting plates 86a and 86d, as viewed in Fig. 5, are connected together by rods 90 biased by a compression spring 91 to normally urge and maintain the stretchers 80 in the open position, which position for one of the stretchers 80 is shown in Fig. 8.

Each of the left hand connecting plates 86b, 86c, as viewed in Fig. 5 is connected by a rod 92 to a bell crank lever 94 suitably pivoted on stud shafts 96 extending laterally to the left, as viewed in Fig. 5, from a plate 98 (Fig. 10) depending from the cover frame 66. The inner crossed ends of the levers 94, as viewed in Fig. 10, are engageable by the hooked end 57 of the rod 56 to secure the hamper receiving, squaring and inverting mechanism 24 about the hamper 10 and also to actuate the hamper stretching device. For maintaining the cover frame 66 in the dotted line raised position of Fig. 6, approximately 70° from the solid line position of the cover frame 66 shown in Fig. 6, and in the normal horizontal hamper engaging position shown in the solid lines of Figs. 4-6 and 21, the forward hinge 45, as viewed in Fig. 5, of the cover frame 66 carries a locking cam 100 (Figs. 5, 6). Accordingly, the outer cam surface of the hinge 100 is provided with a pair of notches 102a, 102b, which notches are engageable by a locking lever 104 (Figs. 4 and 6) pivotable on a horizontal stud shaft 106 affixed by means of the bracket 46 to the adjacent side wall of the bulb magazine 48. The lower end of the lever 104 is joined by a connecting rod 110 (Figs. 4 and 6) to a lever 112 (Fig. 4) pivoted at 114 on one of the legs 32 of the conveyor 20. The operating end of the lever 112 extends beyond the adjacent left hand leg 32, as viewed in Fig. 4, and is held in the normally "up," or cover frame locking position, by a spring 116 secured to the adjacent left hand leg 32, of the conveyor 20 and is engageable by the operator's foot.

For the purpose of providing counterweighting means for the cover frame 66, an arm 118 (Figs. 5 and 6) is affixed to each of the stud shafts 44. The outer end, as viewed in Figs. 5 and 6, of each of these arms 118 is connected by means of a link 120 to a rope 122 guidable in rollers 124 (Figs. 4 and 6) secured in a bracket 126 affixed to the adjacent side wall of the bulb magazine 48, which rope 122 carries a suitable counterweight 128 on the lower end (Fig. 4).

*Operation of the hamper stretching device*

At the beginning of this work cycle the counterweighted cover frame 66 is retained in its "up" position (Figs. 6 and 20) by the engagement of the locking lever 104 in the notch 102a in the hinge cam 100. The conveyor 20 then delivers a hamper 10 (Fig. 20), against a stop (not shown) on one of the longitudinal channels 30 of the conveyor 20 and in registry with the bottom slats 36 of the hamper receiving, squaring and inverting device 24. The operator depresses the lever 112 with her foot, thus removing the locking lever 104 from the notch 102a and moves the cover frame 66 by means of the handle 68 in a counterclockwise direction, as viewed in Figs. 6 and 20, so that the anvils 74 at each of the four corners of the cover frame 66 move the top flaps 12 downwardly to position the four corners of the hamper 10 between the anvils 74 and the adjacent stretchers 80 (Figs. 21, 22). Release of the foot lever 112 then seats the lever 104 in the notch 102b and locks the cover frame 66 in the position shown in the solid lines of Figs. 4, 6 and 22. By squeezing the pawl 64 against the handle 60 of the resilient side band 52 the operator releases the pawl 64 from engagement with the ratchet 54 and is able to move the hooked end 57 of the rod 56 upwardly, as viewed in Fig. 6, to hook the end 57 over the overlapping cross operating ends of the bell crank levers 94 (Fig. 23). Pushing downwardly, as viewed in Figs. 6 and 10, on the handle 60, the operator moves the operating ends of the levers 94 downwardly, as viewed in Fig. 10, along the side of the hamper 10 from the solid line position to the dotted line position shown in Fig. 10. This movement of the levers 94 causes the connecting rods 92 to move inwardly toward the hooked end 57 and rotates the connecting plates 86b and 86c in a clockwise and counterclockwise direction respectively, as viewed in Fig. 5, which movement of the plates 86b and 86c moves the side rods 88 to the left. In turn the connecting plates 86a, 86d are similarly rotated in a clockwise and counterclockwise direction respectively, as viewed in Fig. 5, by the movement of the rods 88.

Rotation of the connecting plates 86a, 86b, 86c and 86d move their respective gears 82 (Figs. 7 and 8) in a similar direction, thus causing the individual racks 78, slides 72 and the stretchers 80 to move diagonally outward, as viewed in Figs. 5 and 22, from the center of the hamper 10 and to squeeze the upper corners of the hamper 10 against their respective anvils 74 (Fig. 24) thus squaring the hamper 10. When sufficient pressure has been exerted by the operator to square the corners of the hamper 10, the operator releases her grip on the pawl 64, which pawl 64 engages the ratchet 54, thus locking the squared hamper 10 in position for its inverting transfer from the conveyor 20 to the bulb magazine 48, which transfer is accomplished by the operator by means of the handle 40 (Fig. 4).

During this transfer (Figs. 4, 6, 19 and 25) of the hamper receiving, squaring mechanism 24, a cam 130 affixed to the rear hinge 45, as viewed in Fig. 11, closes a normally open microswitch 132 mounted on the side wall of the bulb magazine 48 and actuates a reciprocating mechanism for raising an article supporting means, or elevating platform 140 (Fig. 4) which platform 140 is reciprocable within the bulb magazine 48.

Bulb magazine

The bulb magazine 48 (Figs. 3, 4, 14, 19, 25 through 32) is an open ended box mounted on four legs 142 upstanding from a portion of the bed-plate 34, which legs 142 are integrated by a plurality of horizontal tie members 144. The upper edge of the bulb magazine 48 is suitably beveled to guide the layered bulbs 16 thereinto during the transfer of the bulbs 16, as hereinafter related, from the inverted hamper receiving, squaring and stretching mechanism 24 to the bulb magazine 48. In addition, the upper portions of the front and rear side walls, as viewed in Fig. 4, of the bulb magazine 48 are provided with spaced longitudinal threading slots 145, for use as later related.

Raising of the elevating platform

The elevating platform 140 is mounted on a piston rod 146 (Figs. 3, 4, 19, 25 through 32) of an air cylinder 148 upstanding from the bed-plate 34, which cylinder 148 is the prime mover for the reciprocating mechanism for the elevating platform 140. To provide smooth movement of the elevating platform 140, the platform is affixed to mount rods 149 (Fig. 4) integrated at the bottom by a plate 149a, which rods 149 reciprocate in top bearings 149b and bottom bearings 149c secured to a channel iron tie 144. In addition, a vertical retarding cam 150 (Fig. 4) having generally tapered spaced raised portions 151 (Fig. 13) is suspended from the elevating platform 140 and has its lower portion as viewed in Fig. 4, connected to a plate 149a. As shown in Figs. 3, 13 and 19, a bell crank lever 152 is pivoted at 154 on one of the lower horizontal ties 144 and has its roller carrying end biased by means of a spring 156 into engagement with the retarding cam 150. To limit the clockwise rotation, as viewed in Figs. 3 and 13, of the lever 152, a stop 158 (Figs. 3 and 13) is mounted on the tie 144. The lower end of this lever 152 is connected by a link 160 to a reducing valve 162 mounted on the bed-plate 34, which valve 162 is opened wide and partially closed by the above described linkage and the cam 150. For the purpose of locking the elevating platform 140 in a desired elevated position, a piston rod 172 (Fig. 13) of an air cylinder 174 mounted on a vertical plate 166 secured to the tie 144, is normally biased by means of a spring 176 (Fig. 19) into engagement with one of a plurality of spaced piston receiving apertures 178 provided with the left hand side wall, as viewed in Figs. 3 and 13 of the cam 150. To provide the required rigidity to this locking device the extended piston rod 172 (Fig. 13) reciprocates in a bearing 179 mounted on the plate 166 between the air cylinder 174 and the cam 150.

As shown in Fig. 19 electrical means, such as a solenoid operated air valve 200, is provided to cause the removal of the piston rod 172 from the cam 150 on the platform 140. One of the windings 190 of this air-valve solenoid 191 is energized by a first "unlocking" circuit which extends from one side of a suitable voltage supply, indicated by the legend "A.C. Supply," through a conductor 180 to one side of the aforementioned open microswitch 132 disposed adjacent the side wall of the magazine 48. The other side of this switch 132 is connected by a conductor 188 to one end of the operating coil 190 of the air valve solenoid 191 and from the other end of this winding 190 a conductor 192 extends to the other side of the voltage supply.

Still referring to Fig. 19, an air line 210 of a "compressed air supply" extends to a four-way valve 214, which is joined by an air line 216 to the aforementioned reducing valve 162. An air line 218 extends from this reducing valve 162 to the bottom side of the air cylinder 148. It will be understood from a consideration of Fig. 19 that the valve 214 is adapted to normally admit compressed air to the reducing valve 162, which latter is desirably open a sufficient amount to supply a reduced pressure of compressed air to the air cylinder 148 to raise the platform 140, even when the valve 162 is in engagement with a raised portion of the retarding cam 150, but lifting of the elevating platform 140 is prevented by the engagement of piston rod 172 with one of the locking apertures 178 in the cam 150.

The same "compressed air supply" system (Fig. 19) is employed for operating the air cylinder 174 to cause release of the platform 140 when desired, which system includes an air line 198 and another line 208 for connecting a two-way valve 200 to the compressed air supply and to the air cylinder 174. An operating stem 202 of the valve 200 is pivotably connected to the armature 204 of the air valve solenoid 191, which armature is biased by means of a tension spring 206 to normally maintain the valve stem 202 in the position shown in Fig. 19, thus effectively keeping the valve "closed" by permitting the escape of the compressed air from the supply source to the atmosphere upon opening of the valve 200 by energization of the solenoid coil 190 compressed air is then supplied to the air cylinder 174 causing movement of the piston rod 172 and disengagement thereof from the notch 178 in the cam 150 and releasing the latter so that elevation of the platform 140 by the compressed air system then follows such release of the cam 150.

Closure of the switch 132 by the cam 130 carried by the magazine 48 when the hamper receiving, squaring and inverting mechanism 24 is in the position shown in Fig. 25, closes the aforementioned circuit from one side of the voltage supply through the conductor 180, the closed switch 132 through conductor 188, and coil 190, then through conductor 192 back to the other side of the voltage supply, thus energizing the coil 190 of the solenoid 191. Energization of the coil 190 causes movement of the armature 204 to the left, as viewed in Fig. 19, "opening" the valve 200 by turning it in a clockwise direction, thus admitting compressed air to the air cylinder 174, which air moves the piston rod 172 to the left, as viewed in Fig. 19, and out of the locking aperture 178 in the cam 150, as above mentioned.

Thus, when the piston rod 172 of the air cylinder 174 is withdrawn from the locking aperture 178 in the cam 150, the piston rod 146 and the elevating platform 140 are moved slowly upward, as viewed in Figs. 13, 19, 25, by the slight constant air pressure flowing through the reducing valve 162 and entering the bottom, as viewed in Figs. 3 and 19, of the air cylinder 148. However, as the roller carrying end of the lever 152 rides down the inclined portion 151 of the cam 150, the valve 162 opens wide to increase the air pressure supplied to the cylinder 148 and the elevating platform is thus elevated rapidly to engage the descending cover frame 66 of the inverted hamper receiving, squaring and inverting mechanism 24 about to be supported by the bulb magazine 48, as shown in Figs. 25 and 26.

As the elevating platform 140 approaches the top of its travel and as the hamper receiving, squaring and inverting mechanism 24 nears the end of its inverting swing, the cam 100 on such mechanism 24 (Fig. 11) opens the switch 132, thus deenergizing the coil 190. This deenergization of the coil 190 causes the spring biased armature 204 to move to the right, as viewed in Fig. 19, returning the valve 200 to its "closed" position shown in Fig. 19. The piston rod 172 is then urged by the spring 176, as viewed in Figs. 13 and 19, into engagement with the lowermost locking aperture 178 in the cam 150 which thus locks the elevating platform 140 in its "up" position (Fig. 26), in preparation for the removal of the slide 69 from the cover frame 66.

Removal of the slide

The removal of the slide 69 (Figs. 26, 27) causes the cam 71 carried thereby to close the contacts of double-throw switch 72 affixed to the magazine 48 which switch 72 controls a second "unlocking" circuit for causing the release of the cam 150 and a "lowering" circuit for causing the lowering of the platform 140 to transfer the bulbs 16 from the mechanism 24 to the bulb magazine 48. The second "unlocking" circuit extends from conductor 180 (effectively one side of supply source) to one side of the normally open, but now closed lower contact, as viewed in Fig. 19, of the switch 72. The other side of the lower contact of the switch 72 is connected by a conductor 226 through a junction point 228 to one end of another coil 230 of the solenoid 191 while the other end of this coil 230 is connected by a conductor 232 to a junction 194 in the conductor 192 which constitutes the other side of the supply source thus completing this circuit.

Thus, closure of the lower contact of the switch 72 in this second "unlocking" circuit by the cam 71 causes closure of this latter circuit, thus resulting in the energization of the solenoid coil 230 which causes solenoid armature 204 to move to the left, as viewed in Fig. 19, to once more rotate the valve 200 in a clockwise direction and cause withdrawal of the piston 172 from the uppermost locking aperture 178, thus permitting the lowering of the platform 140 by the simultaneous energization of the above mentioned second "unlocking" circuit.

A "lowering" circuit includes a conductor 234 extending from the junction point 222 in the line 180 (which effectively constitutes one side of the supply source) to the upper contact, as viewed in Fig. 19, of the double throw switch 72, with such circuit then extending from the other side of the upper contact of the switch 72, through a conductor 236 to one end of a coil 238 of a platform-control solenoid 239 for rotating the aforementioned four-way valve 214, and thence by means of a conductor 242 from the other side of the coil 238 through junction point 246 to the line 192 which constitutes the other side of the supply source. An operating stem 248 of the valve 214 (Fig. 19) is pivotably connected to the armature 250 of the platform-lowering solenoid 239 so that energization of the coil 238 causes movement of the armature to the right with attendant counterclockwise rotation of valve 214, as viewed in Fig. 19.

Upon such counterclockwise rotation of valve 214 the air-line 210 is connected by means of another air-line 252 to the top of the air-cylinder 148 with the result that the air pressure then is applied to the top of the piston rod 146.

Thus, bridging of the upper contacts of the double-throw switch 72 simultaneously with bridging of its lower contacts causes closure of the "lowering" circuit with attendant energization of the coil 238 and movement of the armature 250 to the right, as above mentioned, accompanied by rotation of the valve 214 to permit the flow of compressed air into the air cylinder 148 with forcing of the piston rod 146, together with the elevating platform 140 and the layered bulbs 16 downwardly to their lowermost position within the bulb magazine 48, as shown in Fig. 27, simultaneously with unlocking of the cam 150. The now empty hamper 10 is then prepared for the reinsertion of the slide 69 into the cover frame 66.

Insertion of cover slide

When the elevating platform 140 reaches the lowermost position shown in Fig. 27, the operator pushes the handle 70 and the slide 69 to the right and thus to its former position within the aperture in the cover frame 66. This movement of the slide 69 and the cam 71 carried thereby, opens the double throw switch 72, thus deenergizing the above described second "unlocking" circuit and "lowering" circuit for the elevating platform 140.

The operator then grasps the handle 50 on the side plate 42 and rotates the now empty hamper 10 and the hamper receiving, squaring and inverting mechanism 24 counterclockwise to its initial position shown in Figs. 4 and 23 on the delivery end of the conveyor 20. Squeezing the pawl 64 against the handle 60, the operator releases the pawl 64 from the ratchet 54, and moves the handle 60 upwardly (Fig. 4) to release the hooked end 57 of the rod 56 from the crossed operating ends of the levers 94 of the hamper squaring device. The levers 94, urged by the spring 91 between the rods 90 move inwardly, as viewed in Fig. 10, from the dotted position to the solid position, thus rotating the hamper squaring device and causing the stretchers 80 to move away from their respective anvils 74 to release the now empty hamper 10 from the hamper squaring device. The operator then releases the lever 104 from the notch 102b (Fig. 6) and raises and locks the counterweighted cover frame 66, in dotted line position shown in Fig. 6 and the solid line position shown in Fig. 20, and removes the empty hamper 10 by the conveyor 20.

With the elevating platform 140 in its lowermost position in the bulb magazine 48, the uppermost layer of bulbs 16 (Figs. 3 and 4) is in position for the insertion of a threading and lifting mechanism (Figs. 3, 4 and 14) into the adjacent registering threading slots 145 of the bulb magazine and the spaces between the rows of alternately "neck-down" and "neck-up" bulbs 16.

Bulb threading and lifting mechanism

This bulb threading and lifting mechanism (Figs. 3, 14, 16, 17, 19 and 28 through 32) has a frame which is located to the right, as viewed in Fig. 3, of the bulb magazine 48 and consists of a horizontal plate 254 supported by a pair of channels 255 secured to vertical legs 256, which legs 256 are upstanding from the bed-plate 34 and reinforced by diagonal members 258. To provide movable mounting for the threading tines 264, the threading and lifting mechanism is provided with a carriage 260, reciprocable toward and away from the magazine 48 by means of a drive mechanism on tracks or rails 261 affixed to the horizontal plate 254. The carriage 260 carries a U-shaped yoke 262 which supports a threading tine bar 263 seated in the yoke 262 transverse to the longitudinal axis of the carriage 260 and its path of movement (Figs. 3, 14 and 17). The threading tine bar 263 supports a plurality of threading rods or tines 264, suitably twelve in number (Figs. 2, 4 and 16) which tines 264 are desirably spaced the same distance apart as the threading slots 145 in the bulb magazine 48 and which tines project longitudinally to the left, as viewed in Fig. 3, from the bar 263. These tines 264 are provided with tapered outer ends 265 (Figs. 2 and 3) for use, as hereinafter related, and are insertable in the respective registering threading slots 145 in the opposite sides of the bulb magazine 48 and into the spaces between the bulbs 16 in the upper layer of the bulb magazine 48. Further, the outer ends of the tine bars 263 are movable by the carriage 260 during the inserting operation under a pair of rear guide rods 265a and against a pair of forward guide rods 265b which rods 265a, 265b (Fig. 15) are secured to the legs 256 and guide the upward movement of the tine bar 263, tines 264 and the bulbs 16 supported on the tines 264 during the lifting operation.

*Reciprocating mechanism for carriage*

The drive mechanism for reciprocating the carriage 260 toward and away from the magazine 48 has a rack 266 connected to a piston rod 267 of an air cylinder 268 secured to the right hand leg 256 (Fig. 3) of the frame of the threading and lifting mechanism, which rack 266 is suitably reciprocable in a bracket 272 on which is secured a gear 276 in engagement with the rack 266. The shaft 274 also carries a drive member 278, suitably a sprocket, for a continuous member 279. This continuous member 279, suitably a linked chain, extends around and is supported by the drive member 278, a guide sprocket 280 pivoted on the left hand end, as viewed in Fig. 3 of the horizontal channel 254 and a spring biased guide sprocket 282 resiliently pivoted on the right hand leg 256 of the frame of the threading and lifting mechanism. The carriage 260 is secured to the upper portions of the continuous member 279 by means of a depending bracket 285 (Figs. 3 and 14) secured, as by pinning, to a like of the continuous member 279. The movement of the piston rod 266 of the air cylinder 268 to cause movement of the carriage 260 with insertion of the tines 264 is caused by the closure of a "tine threading" circuit, similar to the above described "lowering" circuit for the platform 140, which closure is achieved by the manual closing of a normally-open push-button 292 (Fig. 19).

As shown in Fig. 19, this "tine threading" circuit includes a conductor 286 which extends from a junction point 288 in the line conductor 180 to one side of the push button 292 and such circuit extends from the other side of this push button 292 by means of a conductor 294 to one end of a coil 296 of a solenoid 297 for operating a four-way valve 299 (Figs. 19 and 28) for controlling the movement of the piston rod 266 of the air cylinder 268. This circuit then is completed from the other side of the coil 296 by a conductor 298 through junction point 302 to the other line conductor 192.

The air supply system for the air cylinder 268 has an air line 304 which connects the valve 299 to the bottom, as viewed in Fig. 3, of the air cylinder 268 and another port of the valve 299 is connected by an air line 308 to the top of this air cylinder 268. The inlet side of the valve 299 (Fig. 19) is joined by an air line 309 which extends from the air-supply line 210. An operating stem 310 of the valve 299 is pivotally connected to an armature 312 of the solenoid 297 and is movable to the left, as viewed in Fig. 19, upon energization of the coil 296.

Hence, when the operator depresses the push button 292, the above mentioned "tine threading" circuit is closed, thus energizing the coil 296 from the "A.C. Supply." Energization of this coil 296 moves the armature 312 to the left, as above mentioned, and causes rotation of the valve stem 310 clockwise from the dotted line position shown in Fig. 19 to the solid line position with resultant rotation of the valve 299 in a clockwise direction to the position shown in Fig. 19, admitting compressed air through the air lines 210, 309, the valve 299 and the air line 308 to the top, as viewed in Fig. 3, of the air cylinder 268 and causing the movement of the piston rod 267 and the rack 266 downwardly, as viewed in Fig. 3. This downward movement of the rack 266 rotates the gear 276 and the drive member 278 in a counterclockwise direction as viewed in Fig. 3, thus moving the upper portion of the movable continuous member 279 and the carriage 260 to the left from the dotted line position shown in Fig. 3 to the solid line position which causes the tines 264 to likewise move to the left. The fourth and ninth tines, as counted from the left to the right in Fig. 14, pass through suitable apertures in a pair of adjacent lifting hubs 314 of a tine bar lifting mechanism and all the tines 264 pass through the aligned right hand threading slots 145, in the bulb magazine 48, as viewed in Figs. 3, 28 through the spaces between the layered bulbs 16 in the top layer of the bulb magazine 48 and through the aligned left hand threading slots 145 in the bulb magazine 48 and also into similar aligning slots in a lifting plate 316 of the tine bar lifting mechanism.

*Tine bar lifting mechanism*

Each of the lifting hubs 314 of the tine bar lifting mechanism (Figs. 3, 14, 19, 28 through 32) is affixed to a mount rod 318 reciprocable in an upper bearing 320, as viewed in Figs. 3, 14, one of the upper tines 144 and a lower bearing 322 on one of the lower ties 144 of the bulb magazine frame. The middle portions of the mount rods 318, as viewed in Fig. 14, are secured to a horizontal plate 324 affixed to a piston rod 326 (Figs. 3 and 14) of an air cylinder 328, which cylinder 328 is mounted on an adjacent leg 142 of the bulb magazine frame. The movement of the piston rod 326 of the cylinder 328 to lift the tine bar 263 is caused by closure of a "tine bar lifting" circuit which closure is accomplished by the manual closing of a normally open pushbutton 336 (Fig. 19). This "tine bar lifting" circuit is similar in structure and operation to the "lowering" circuit for the platform 140 and the "tine threading" circuit for the tines 264.

As shown in Fig. 19, the "tine bar lifting" circuit comprises a conductor 330 which extends from the line conductor 180 to one side of the push button 336 with such circuit then extending from the other side of this push button 336 through a conductor 338 to one end of a coil 340 of a solenoid 341 for operating a valve 342 (Fig. 28), which valve is adapted to control the movement of the piston rod 326 of the air cylinder 328 to raise and lower the lifting hubs 314. This "tine bar lifting" circuit is then completed by a conductor 343 (Fig. 19) extending from the other end of the coil 340 to the other line conductor 192. A valve stem 348 (Fig. 19) of the valve 342 is pivotally connected to an armature 350 of the solenoid 341 which is operable by energization of the coil 340 to turn the valve 342.

As shown in Figs. 19 and 28, an air line 352 extends from the air line 210 to the valve 342 with the latter being joined by an air line 356 (Fig. 28) through a branch connection 357 to the top, as viewed in Figs. 3 and 28 of the air cylinder 328 and such valve 342 is connected through a branch connection 359 by another air line 360 to the bottom of this air cylinder 328.

The lifting plate 316 of the tine bar lifting mechanism is secured by a bracket 358 (Fig. 3) to a piston rod 360' of an air cylinder 362 mounted on the left hand leg 142, as viewed in Fig. 3, the bulb magazine frame. It will be understood from a consideration of Fig. 28 that the air cylinder 362 is provided with an air line 364 connecting its top portion through the branch connection 357 to the air line 360.

Hence, closure of the push button 336 in the "tine bar lifting" circuit by the operator closes the above described circuit thus energizing the coil 340 from the "A.C. Supply."

Energization of the coil 340 moves the armature 350, to the left, as viewed in Fig. 19, from its dotted position 19 to the solid line position shown therein. Such movement of the armature 350 rotates the valve stem 348 and the valve 342 in a clockwise direction, thus admitting air through the line 352, the valve 342 and the air-line 360 to the bottom of the air cylinder 328, as viewed in Fig. 28, and through the line 368 to the bottom of the air cylinder 362. Simultaneously, the piston rods 326 and 360 of these air cylinders 328 and 362, as well as the lifting plate 316 and the lifting hubs 314 move upwardly, as viewed in Figs. 3 and 28, to raise the tine bar 263 off the yoke 262 in the carriage 260, along the guides 265a, 265b (Fig. 14), to the dotted line position shown in Fig. 28 and the solid line position shown in Fig. 29. It will be understood that at the end of this upward movement the tapered ends 265 of the tines 264 are in alignment with tine receiving ends 372 of rods 454 (Figs. 3 and 29) of a bulb sorting and feeding mechanism and the tine bar 263 is in engagement with a horizontally reciprocable inverted U-shaped yoke 374 of a tine inserting mechanism.

Tine inserting mechanism

The frame of the tine inserting mechanism, as shown particularly in Figs. 16 and 17, comprises a longitudinal channel 376 mounted on horizontal ties 378, which ties 378 are secured to the legs 256 of the bulb threading mechanism frame. The yoke 374 is horizontally reciprocable in a suitable guide 386 provided in the channel 376 and is connected to a piston rod 384 of an air cylinder 387, secured by depending brackets 388 to the channel 376. The movement of the piston rod 384 of the air cylinder to cause the insertion of the tapered end 265 of the tines 264 into the ends 372 of the rods 454 is caused by closure of a "tine engaging" circuit, which closure results from the manual closing of a normally open push button 394 and which "tine inserting" circuit is similar to the above described circuits for lowering the platform 140, threading the tines 264, and raising the tine bar 263.

Referring now again to Fig. 19, this "tine engaging" circuit includes a conductor 388 extending from the line conductor 180 to one side of the push button 394 with such circuit then extending from the other side of this push button 394 through a conductor 395 to one end of a coil 396 of a solenoid 390 for operating a valve 400, which valve 400 is operatively associated with the air cylinder 386. Such circuit is completed by a conductor 397 which extends from the other end of the coil 396 to the other line conductor 192.

As described in the preceding similar air-valve operations a valve stem 402 (Fig. 19) is pivotably connected to an armature 404 which is reciprocable by the solenoid 390 upon energization of the coil 396, to rotate the valve 400 thus admitting compressed air through an air line 406 (Figs. 19, 29) extending from the supply line 210, to the valve 400. The valve 400 is similarly connected by an air line 412 (Figs. 17 and 29) to the right hand portion of the air cylinder 387.

Hence, when the operator depresses the push button 394, the above noted "tine engaging" circuit is closed thus energizing the coil 396 from the "A.C. Supply" source with attendant movement of the armature 404 to the left, as viewed in Fig. 19, from the dotted line position shown therein to the solid line position which rotates the valve 400 in a clockwise direction, permitting the flow of compressed air through the air line 406 (Figs. 29–31), the valve 400, the air line 412 into the right hand end, as viewed in Figs. 17 and 29, of the air cylinder 387. This flow of air moves the piston rod 384, the yoke 374, the tine bar 263 and the tines 264 to the left, as viewed in Fig. 29, to insert the tapered outer ends 265 of the tines 264 into the adjacent aligned tine receiving ends 372 of the rods 454 of the bulb sorting and feeding mechanism, indicated at the left of Figs. 29 through 32, ready for operation of a bulb delivery mechanism for transferring the bulbs from the tines 264 to the rods 454.

Bulb delivery mechanism

The operator then depresses a normally open push button 414 (Fig. 19) to close a circuit for causing the movement of the article delivery means or bulb delivery mechanism across the supported elevated tines 264 to deliver the bulbs 16 to the bulb sorting and feeding mechanism. This delivery mechanism (Figs. 2, 3, 15, 16, 17, 9, 29 through 32) consists of a pusher plate 416, carried on the left hand end, as viewed in Figs. 3, 16 and 17 of a piston rod 418 of an air cylinder 420 secured to the top portion of the channel 376. To provide stability to the bulb delivery mechanism, the pusher plate 416 is secured to the left hand end, as viewed in Figs. 16 and 17 of a pair of mount rods 422, which rods 422 are reciprocable in bearings 424 secured to the side walls of the channel 376. As shown particularly in Fig. 15, the plate 416 is provided with a plurality of the tine clearance slots 426, similar to the slots 145 in the bulb magazine 48, which slots 426 are adapted to receive the tines 264 therein at the end of their upward movement. The movement of the piston rod 418 of the air cylinder 420 to deliver the bulbs 16 to the bulb sorting and feeding mechanism is actuated by closure of a "bulb delivery" circuit (Fig. 19), which circuit is closed by the manual closing of a normally open push button 414 and is similar to the circuits for lowering the platform 140, threading the tines 264, raising the tine bar 263 and inserting the tines 264.

As shown in Fig. 19, this "bulb delivery" circuit extends from the line conductor 180 to one side of the push button 414 and from the other side thereof by a conductor 432 to one end of a coil 434 of a solenoid 435 for controlling the movement of a valve 436, operatively associated with the air cylinder 420. This circuit is then completed from the other end of the coil 434 by a conductor 438 to the other line conductor 192.

It will be understood from Fig. 19 that a valve stem 440 of the valve 436 is similarly connected to an armature 442 of the solenoid 435 which armature 442 is operable upon energization of the coil 434 to turn the valve 436 and to supply compressed air through an air line 448 extending from the air line 210, to the valve 436. The air is then alternatively delivered through the valve 436 either through an air line 450 extending from the valve 436 to the left hand end, of the air cylinder 420, as viewed in Figs. 29–31, or such air is delivered to an air line 452 connecting the valve 436 to the right hand end of the air cylinder 420.

Thus, when the operator depresses the push button 414 in the "bulb delivery" circuit the latter is closed thus energiging the coil 434 causing movement of the armature 442 to the left, as viewed in Fig. 19, from the dotted line position to the solid line position shown therein and rotating the valve 436 clockwise permitting the flow of compressed air through the air line 452 to the right hand end, as viewed in Fig. 31, of the air cylinder 420. This flow of air moves the piston rod 418 and the pusher plate 416 to the left, as viewed in Fig. 31, thus pushing the bulbs 16 supported on the tines 264 onto the then connected gravity type rods 454 of the bulb sorting and feeding mechanism, which rods 454 form feeding lanes adapted to support the bulbs 16 in either the "neck-up" or "neck-down" position.

When all of the bulbs 16 have been delivered by the bulb delivery mechanism to their respective lanes between the rods 454, the operator depresses a normally open push button 456 (Fig. 19) thus actuating a "retracting" circuit for causing the retraction of the bulb delivery mechanism.

Retraction of the bulb delivery mechanism

This "retracting" circuit extends from the line conductor 180 through a conductor 458 to one side of the push button 456 and from the other side thereof by a conductor 460 to one end of another coil 462 of the solenoid 435 which when energized causes the armature 442 to move to the right, as viewed in Fig. 19. This "retracting circuit is then completed from the other end of the coil 462 by a conductor 464 extending to the other line conductor 192.

Thus, when the operator depresses the push button 456, this "retracting" circuit is closed, thus energizing the coil 462 and causing retraction of the armature 442 to the right, as viewed in Fig. 19. This movement of the armature 442 rotates the valve 436 in a counterclockwise direction, to admit compressed air through the air lines 210 and 448 to the valve 436, (Figs. 28–32), and from such valve through the air line 450 to the left hand end, of the air cylinder 420, as viewed in Fig. 32. The compressed air moves the piston rod 418 and the pusher plate 416 to the right, as viewed in Fig. 32, to its initial starting position shown in Fig. 28.

The operator then depresses a normally open push button 466 (Fig. 19) thus actuating a circuit for disengaging the tines 264 from the tine receiving ends 372 of the rods 454 of the bulb feeding mechanism.

Disengagement of the tines

As shown in Fig. 19 the "tine disengaging" circuit extends by means of conductors 388 and 468 from the line conductor 180 to one side of the push button 466 from the line conductor 180 to one side of the push button 466 and from the other side thereof by a conductor 470 to one end of a second coil 472 of the solenoid 390 for moving the armature 404 to the right, as viewed in Fig. 19. This circuit is then completed from the other end of the coil 472 by a conductor 474 to the other line conductor 192.

Thus, when the operator depresses the push button 466 this "tine disengaging" circuit is closed, thus energizing the coil 472 which causes the moving of the armature 404 to the right, as viewed in Fig. 19, and rotating the valve 400 in a counterclockwise direction to permit the flow of compressed air through the air lines 210 and 406 to the valve 400, and from such valve through the air line 410 into the left hand end, as viewed in Figs. 29 through 32, of the air cylinder 387, thus causing the disengagement of the tapered ends 265 of the tines 264 from the tine receiving end portions 372 of the rods 454.

The operator then closes a normally open push button 476 (Fig. 19) to actuate a "tine bar lowering" circuit for causing the lowering of the supporting plate 316 together with the now empty tines 264 and tine bar 263, as well as the lifting hubs 314, to their starting position (Fig. 28).

Lowering of the lifting mechanism

As shown in Fig. 19, the "tine bar lowering" circuit extends from the line conductor 180 through conductors 330 and 478 to one side of the push button 476 and from the other side thereof by a conductor 480 to one end of a coil 482 of the solenoid 341 for moving the armature 350 to the right, as viewed in Fig. 19. This circuit is then completed by a conductor 484 extending from the other end of the coil 482 to the other line conductor 192.

Thus, when the operator depresses the push button 476 this "tine bar lowering" circuit is closed, thus energizing the coil 482 and causing movement of the armature 350 to the right, as viewed in Fig. 19, and rotation of the valve 342 in a counterclockwise direction permitting compressed air to flow through the air lines 210 and 352, the valve 342 and the air line 356 to the top, as viewed in Figs. 28 to 32, of the air cylinder 328 and through the air line 364 to the top of air cylinder 362. Simultaneously, the piston rods 360' and 326 of the air cylinders 362 and 328 respectively, move the lifting plate 316, the lifting hubs 314 and the now empty tines 264 supported therebetween, downwardly, as viewed in Fig. 28, to the lowermost position shown therein which deposits the tine bar 263 again in the yoke 262 on the carriage 260.

The operator then depresses a manually operated normally open push button 486 (Fig. 19) to close a "tine retracting" circuit for retracting the tines 264 from the slots in the lifting plate 316, the threading slots 145 of the bulb magazine 48, and the apertures in the lifting hubs 314.

Retraction of the tines

As shown in Fig. 19, this "tine retracting" circuit extends from the line conductor 180 through conductors 286 and 488 to one side of the push button 486 and from the other side thereof by means of a conductor 490 to one end of another coil 492 of the solenoid 297 for moving the armature 312 to the right, as viewed in Fig. 19, to the dotted line position shown therein. This "tine retracting" circuit is then completed from the other end of the coil 492 by a conductor 494 to the other line conductor 192.

Thus, when the operator depresses the push button 486 this "tine retracting" circuit is closed, thus energizing the coil 492 which causes movement of the armature 312 to the right, as viewed in Fig. 19. The resultant movement of the armature 312 rotates the valve 306 (Fig. 19) in a counterclockwise direction permitting the flow of compressed air through the air lines 210 and 309 to the valve 299 (Figs. 19, 28 and 31), and from such valve through the air line 308 into the top, as viewed in Figs. 3, 28 and 31, of the air cylinder 268, to cause the downward movement of the operating piston 267 and the rack 266. This movement of the rack 266 rotates the gear 276 in a clockwise direction, as viewed in Figs. 3, 29 and 31, thus causing the top portion of the continuous member 279 and the carriage 260 secured thereto, to move from left to right, which retracts the tines 264 from the lifting plate 316, the slots 145 in the bulb magazine 48 and the lifting hubs 314.

The operator then depresses a double contact push button 496 for closing a third "unlocking" circuit for withdrawing the operating plunger 172 of the air cylinder 174 from the aperture 178 in the retarding cam 150 and another circuit, hereinafter referred to as a "layer lifting" circuit, for raising the elevating platform 140 to present the next layer of bulbs 16 to the threading position in the bulb magazine 48.

Elevation of the next layer of bulbs

The third "unlocking" circuit has a conductor 498 which extends from the line conductor 180 to one of the upper contacts, as viewed in Fig. 19, of the push button 496 and the other upper contact of the switch 496 is connected to the aforementioned conductor 226 extending to one end of the solenoid coil 230 which has its other end connected to the other line conductor 192 thus completing the circuit to the "A.C. Supply" source.

The "layer lifting" circuit extends from the line conductor 180 by means of a conductor 502 to one of the lower contacts of the push-button 496 and from the other lower contact of the push button 496 through a conductor 504 to one end of another coil 506 of the solenoid 239 for moving the armature 250 to the position shown in Fig. 19. Such "layer lifting" circuit is then completed from the other end of the coil 506 by a conductor 508 to the other line conductor 192.

Thus, when the operator depresses the double contact push button 496, the third "unlocking" circuit and the "layer lifting" circuit are simultaneously closed. Closure of the "third unlocking" circuit accordingly causes energization of the coil 230, with attendant movement of the armature 204 to the left, as viewed in Fig. 19, and rotating the valve 200 in a clockwise direction to admit compressed air through the air line 198, the valve 200, the air line 208 to the right hand end, of air cylinder 174, as viewed in Figs. 13 and 19. This flow of compressed air moves the piston rod 172 of the air cylinder 174 to the left to remove the piston rod 172 from the locking aperture 178 in the cam 150.

Simultaneously, closure of the "layer lifting" circuit causes energization of the coil 506 accompanied by movement of the armature 250 to the left, as viewed in Fig. 19, to the solid line position shown therein. This movement of the armature 250 rotates the valve 214 in a clockwise direction permitting the flow of compressed air through the air line 210, valve 214, air line 216, reducing valve 162, and air line 218 to the bottom of the air cylinder 148, thus causing the upward movement of the piston 146, the elevating platform 140 and the bulbs 16 stacked thereon.

As the next layer 14 of bulbs 16 approaches the time threading position, the operator releases the push button 496 to deenergize the above described third "unlocking" circuit and "layer lifting" circuit. Deenergization of this "layer lifting" circuit by release of push button 496 does not, however, cause complete stoppage of the upward movement of the piston 146 and platform 140 nor the cam 150 carried by such platform because of the aforementioned air-leakage through reducing valve 162. Hence, the cam 150 (along with piston 146 and platform 140) continues a slow upward movement, since valve 214 is still "open," with the piston rod 172 (Figs. 13 and 19), under urging by the spring 176, bearing against the left hand side wall, as viewed in Fig. 19, of the retarding cam 150, and which rod rides thereon until the end of such rod aligns and snaps in the next cam aperture 178. This engagement of the piston rod 172 in the aperture 178 occurs when the roller carrying end of the bell crank lever 152 rides up one of the inclined portions 151 of the retarding cam 150, thus reducing the flow of compressed air through the valve 162 and slowing down the rate of upward movement of the platform 140 and allowing the piston rod 172 of the air cylinder 174 to snap into the next locking aperture 178 in the retarding cam 150 as the aperture reaches the end of the piston rod 172. Stoppage of the platform 140 thus aligns the next layer 14 of the bulbs 16 for the next cycle of operation, namely, threading the tines 264 into the layer 14, lifting the layer 14 to the delivery position, inserting the tines 264 into the sorting and feeding mechanism, and delivering the bulbs 16 to the sorting and feeding mechanism, as previously described relative to the first layer 14.

The operator then reaches into the bulb magazine 48, removes the top spacing sheet 18 (Figs. 1, 3, 4, 13) from the top of the then uppermost layer 14 of the bulbs 16 and transfers the sheet 18 in an appropriate location on top of the frame of the mechanism.

*Bulb sorting and feeding mechanism*

The frame of the bulb sorting and feeding mechanism comprises essentially a pair of upper horizontal channels 510, as viewed in Fig. 3, mounted on corner legs 512, which are upstanding from the bed-plate 34; an intermediate group of integrated horizontal channels 514 for connecting the legs 512 and supporting an article orienting and feeding device; and a lower table 516 also secured to the legs 512 and employed for supporting a drive means, such as a motor 518, for the orienting and feeding device.

As shown more particularly in Fig. 3, the horizontal channels 510 support a downwardly inclined roller type conveyor 520 for receiving the separating sheets 18 which the operator has removed from the top of successive layers 14 of the bulbs 16 after these layers 14 are positioned in the layer threading position, as hereinbefore described. These sheets 18 then move down the conveyor 520 by gravity for stacking and storing.

The rods 454 of the bulb sorting and feeding device are mounted on the leg 512 and have a right hand inclined portion 521, as viewed in Fig. 3, extending from the engaged elevated tines 264 to a generally horizontal mid-portion 522 and a second inclined left hand portion 524, for transferring the "neck-down" bulbs 16 to an article receiving means, such as a sealing machine (not shown). The lanes between the rods 454 are suitably widened, as shown in Fig. 2, at the bottom of the right hand inclined portion 521, as viewed in Fig. 3, to retain the "neck-down" bulbs thereon and to permit the "neck-up" bulbs 16 to fall therethrough into the bulb orienting and feeding device.

As also shown in Fig. 2, the lanes formed by the mid-portions 522 of the rods 454 and the lanes formed by the left hand inclined portions 524, as viewed in Fig. 3, of the rods 454 have the same width as the widened portions of the lanes formed by the portions 521 and only support bulbs 16 in the "neck-down" position.

*Bulb orienting and feeding device*

The "neck-up" bulbs 16 which are rejected by the bulb sorting and feeding mechanism fall into orienting lanes of the bulb orienting and feeding device. These orienting lanes are formed by a plurality of continuously movable spaced parallel members, such as belts 526, adapted to support the bowl of the bulbs 16 in the "neck-down" position by allowing the bulb necks to pass through the spacing therebetween, as shown in Fig. 3. These continuously movable members, 526 extend around and are supported by individual pairs of pulleys 528 on shafts 530 suitably journalled in outer bearings 532 and middle bearings 534 (Fig. 2) which are mounted on the inner intermediate channels 514. The left hand shaft 530, as viewed in Fig. 3, carries a driving member, such as a pulley 536, which is connected to the motor 518, in a suitable manner, such as by a drive-chain or belt 538. The shafts 530 are desirably rotatable in a counterclockwise direction, as viewed in Fig. 3, so that the continuously movable belts 526 move to feed the oriented bulbs 16 toward the left hand end of the bulb orienting and feeding device.

The bulb orienting and feeding device is provided with a plurality of orienting plates 540, the mid-portions of which, as viewed in Fig. 3, are supported by vertical members 541 upstanding from the intermediate channels 514. The plates 540 are inclined generally downwardly from right to left, as viewed in Fig. 3 underneath the lanes formed by the continuous moving members 526 and have their right hand ends affixed to a cover plate 542 supported on a bracket 543 upstanding from the table 514. The orienting plates 540 are adapted to be contacted by the neck or cullet portions of the bulbs 16 as they fall from the widened portions of the lanes formed between the rods 454 and the necks thereof pass through the spacing between the belts 526 to insure that the bulbs 16 are in a generally horizontal position, as shown in Fig. 3 when the bulbs 16 begin to follow their path of movement from right to left along the lanes formed between the movable members 526. As the bulbs 16 proceed along the lanes between the movable members 526 the inclined neck supporting surface of the orienting plates 540 gradually guide the moving supported bulbs 16 to the desired "neck-down" position, in which position they are received in inclined feeding lanes formed by rods 546. These rods 546 are mounted on the left hand legs 510, as viewed in Fig. 3 and on brackets 548 on the channels 514. These feeding lanes are desirably parallel to the outer portion 524 of the rods 454 of the bulb sorting and feeding device and deliver the oriented bulbs 16 to the article receiving means, such as a sealing machine (not shown) in the same manner as they are delivered from the outer portion 524.

It will be understood that the apparatus for unloading, orienting and feeding articles may be made completely automatic by the substitution of automatically operable switches for the manually operated push buttons herein shown and described, with such automatically operable switches being actuated by cams properly positioned so as to be operated at the desired moment during movement of the various mechanisms of the apparatus.

Thus, it will be seen from the foregoing description that the objects of the invention have been achieved by providing apparatus for receiving a hamper 10 of lamp bulbs 16 arranged in alternate "neck-down" "neck-up" order, for squaring and inverting the hamper 10, for transferring the bulbs 16 into an article receiving magazine 48, for selecting and elevating the top layer of bulbs 16, for rejecting the "neck-up" bulbs 16, for feeding the "neck-down" bulbs 16 to an article receiving means, such as a sealing machine, for orienting the "neck-up" bulbs 16 in the desired "neck-down" position and for feeding the oriented bulbs 16 to the sealing machine. The apparatus eliminates the handling of fragile lamp bulbs 16 during the transfer of said bulbs from a hamper 10 to the sealing machine, assures positive feeding of the bulbs to the sealing machine and is adapted to feed the bulbs 16 to the sealing machine at high speed.

Although a specific embodiment of the present invention has been herein shown and described, it is to be understood that other modifications thereof may be made without departing from the scope of the present invention.

I claim:

1. Apparatus for unloading layered bulbous articles from a hamper and feeding said articles to an article-receiving device, comprising a hamper-receiving and squaring means movable from a hamper-receiving position to a hamper-inverting position, means for feeding a hamper to said hamper-receiving and squaring means, means adjacent said hamper-receiving and squaring means for supporting the latter with the articles therein when inverted, means for storing said layered articles after removal from said hamper, article-supporting means reciprocal in said storing means and actuated by movement of said hamper-receiving and squaring means to move into juxtaposition with said inverted hamper-receiving and squaring means, means on said hamper-receiving and squaring means movable to release said inverted articles from said squared inverted hamper and to cause said article-supporting means to remove said articles from said squared inverted hamper and to insert said articles in said storing means, and threading and lifting means movable into said storing means and the spaces between said layered articles and operable to select a layer of articles from said article-storing means and lift said layer into registry with an article-receiving means.

2. Apparatus for unloading layered bulbous articles from a hamper and sorting and feeding said articles to an article receiving device, comprising a hamper-receiving and squaring means movable from a hamper-receiving position to a hamper-inverting position, means for feeding a hamper to said hamper-receiving and squaring means, means adjacent said hamper-receiving and squaring and inverting means for supporting the latter with the articles therein when inverted, means for storing said layered articles after removal from said hamper-receiving and squaring means, article-supporting means reciprocal in said storing means and actuated by movement of said hamper-receiving and squaring means to move into juxtaposition with said inverted hamper-receiving and squaring means, means on said hamper-receiving and squaring means movable to release said inverted articles from said squared inverted hamper and to actuate said article supporting means to remove said articles from said squared inverted hamper and to insert said articles in said storing means, article-sorting and feeding means adapted to deliver the articles in the desired position to said article-receiving device and operable to eject any articles not in the desired position, and threading and lifting means movable into said storing means and the spaces between said layered articles and operable to select a layer of articles from said article-storing means and to lift said articles from said article-storing means into registry with said article-sorting and feeding means.

3. Apparatus for unloading layered bulbous articles from a hamper, sorting, and orienting said articles in a desired position and feeding said articles to an article-receiving means, comprising a hamper-receiver and squaring means movable from a hamper-receiving position to a hamper-inverting position, means for feeding a hamper to said hamper-receiving and squaring means, means adjacent said hamper-receiving and squaring means for supporting the latter with articles therein when inverted, means for storing said layered articles after removal from said hamper, article-supporting means reciprocal in said storing means and actuated by movement of said hamper-receiving and squaring means to move into juxtaposition with said inverted hamper-receiving and squaring means, means on said hamper-receiving and squaring means movable to release said inverted articles from said squared inverted hamper and to cause said article-supporting means to remove said articles from said squared inverted hamper and to insert said articles in said storing means, article-sorting and feeding means adapted to deliver the articles in the desired position to said article-receiving means and operable to eject any particles not in the desired position, article-orienting and feeding means adapted to receive rejected articles from said article-sorting and feeding means and to orient said articles in the desired position for delivery to said article-receiving means, and threading and lifting means movable into said storing means and the spaces between said layered articles and operable to select a layer of articles from said article-storing means and to lift said articles from said article-storing means into registry with said article-sorting and feeding means.

4. Apparatus for unloading layered bulbous articles from a hamper, sorting and orienting said articles in a desired position and feeding said articles to an article-receiving means, comprising a hamper-receiving and squaring means movable from a hamper-receiving position to a hamper-inverting position, means for feeding a hamper to said hamper-receiving and squaring means, means adjacent said hamper-receiving and squaring means for supporting the latter with the articles therein when inverted, means for storing said layered articles after removal from said hamper, article-supporting means reciprocal in said storing means and actuated by movement of said hamper-receiving and squaring, means to move into juxtaposition with said inverted hamper-receiving and squaring means, means on said hamper-receiving and squaring means movable to release said inverted articles from said squared inverted hamper and to cause said article-supporting means to remove said articles from said squared inverted hamper and to insert said articles in said storing means, article-sorting and feeding means adapted to deliver the articles in the desired position to said article-receiving means and operable to eject any articles not in the desired position, article-orienting and feeding means adapted to receive rejected articles from said article-sorting and feeding means and to orient said articles in the desired position for delivery to said article-receiving means, threading and lifting means movable into said storing means and the spaces between said layered articles and operable to select a layer of articles from said article-storing means and to lift said articles from said article-storing means into registry with said article-sorting and feeding means, and means engageable by said threading and lifting means in the elevated position and operable to insert said threading and lifting means in said article-sorting and feeding means.

5. Apparatus for unloading layered bulbous articles from a hamper, sorting and orienting said articles in a desired position and feeding said articles to an article-receiving means, comprising a hamper-receiving and squaring means movable from a hamper-receiving position to a hamper-inverting position, means for feeding a hamper to said hamper-receiving and squaring means, means adjacent said hamper-receiving and squaring means for supporting the latter with the articles therein when inverted, means for storing said layered articles after removal from said hamper, article-supporting means reciprocal in said storing means and actuated by movement of said hamper-receiving and squaring means to move into juxtaposition with said inverted hamper-receiving and squaring means, means on said hamper-receiving and squaring means movable to release said inverted articles from said squared inverted hamper and to cause said article-supporting means to remove said articles from said squared inverted hamper and to insert said articles in said storing means, article-sorting and feeding means adapted to deliver the articles in the desired position to said article-receiving means and operable to eject any articles not in the desired position, article-orienting and feeding means adapted to receive rejected articles from said article-sorting and feeding means and to orient said articles in the desired position for delivery to said article-receiving means, threading and lifting means movable into said storing means and the spaces between said layered articles and operable to select a layer of articles from said article-storing means and to lift said articles from said article-storing means into registry with said article-sorting and feeding means, means engageable by said threading and lifting means in the elevated position and operable to insert said threading and lifting means in said article-sorting and feeding means, and article-delivery means operable to move said articles from said elevated threading and lifting means onto said article-sorting and feeding means.

6. Apparatus for unloading layered bulbs from a hamper, sorting and orienting said bulbs in a desired position and feeding said bulbs to a bulb-receiving means, comprising a hamper-receiving and squaring means movable from a hamper-receiving position to a hamper-inverting position, means for feeding a hamper to said hamper-receiving and squaring means, means adjacent said hamper-receiving and squaring means for supporting the latter with the articles therein when inverted, means for storing said layered bulbs after removal from said hamper, bulb-supporting means reciprocal in said storing means and actuated by movement of said hamper-receiving and squaring means to move into juxtaposition with said inverted hamper-receiving and squaring means, means on said hamper-receiving and squaring means movable to release said inverted bulbs from said squared inverted hamper and to cause said bulb-supporting means to remove said bulbs from said squared inverted hamper and to insert said bulbs in said storing means, bulb-sorting and feeding means adapted to deliver the bulbs in the desired position to said bulb-receiving means and operable to eject any bulbs not in the desired position, bulb-orienting and feeding means adapted to receive rejected bulbs from said bulb-sorting and feeding means and to orient said bulbs in the desired position for delivery to said bulb-receiving means, threading and lifting means movable into said storing means and the spaces between said layered bulbs and operable to select a layer of bulbs from said bulb-storing means and to lift said bulbs from said bulb-storing means into registry with said bulb-sorting and feeding means, means engageable by said threading and lifting means in the elevated position and operable to insert said threading and lifting means in said bulb-sortng and feeding means and bulb-delivery means operable to move said bulbs from said elevated threading and lifting means onto said bulb-sorting and feeding means.

References Cited in the file of this patent
UNITED STATES PATENTS

| | | |
|---|---|---|
| 900,054 | Bracken | Sept. 29, 1908 |
| 1,623,958 | Bauer | Apr. 12, 1927 |
| 1,799,938 | Wadsworth | Apr. 7, 1931 |
| 2,577,091 | Porter | Dec. 4, 1951 |
| 2,596,339 | Lufkin | May 13, 1952 |
| 2,712,390 | Scholtz | July 5, 1955 |
| 2,718,319 | Jones | Sept. 20, 1955 |
| 2,729,344 | Birchall | Jan. 3, 1956 |